United States Patent
Choi et al.

(10) Patent No.: US 12,426,015 B2
(45) Date of Patent: Sep. 23, 2025

(54) METHOD AND APPARATUS FOR PERFORMING COMMUNICATION FOR TRANSMISSION OF IAB NODE IN WIRELESS COMMUNICATION SYSTEM

(71) Applicant: Samsung Electronics Co., Ltd., Suwon-si (KR)

(72) Inventors: Seunghoon Choi, Suwon-si (KR); Hyunseok Ryu, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 404 days.

(21) Appl. No.: 17/575,036

(22) Filed: Jan. 13, 2022

(65) Prior Publication Data

US 2022/0232562 A1 Jul. 21, 2022

(30) Foreign Application Priority Data

Jan. 18, 2021 (KR) .................. 10-2021-0007107
Sep. 24, 2021 (KR) .................. 10-2021-0126701

(51) Int. Cl.
H04W 72/04 (2023.01)
H04L 5/00 (2006.01)
H04W 72/0446 (2023.01)

(52) U.S. Cl.
CPC ....... H04W 72/0446 (2013.01); H04L 5/0053 (2013.01)

(58) Field of Classification Search
CPC ............. H04W 72/0446; H04L 5/0053; H04L 5/0078; H04L 5/0094
See application file for complete search history.

(56) References Cited

U.S. PATENT DOCUMENTS 11,272,504 B2 * 3/2022 Abedini ............ H04W 72/0446
11,412,505 B2 * 8/2022 Abedini .............. H04W 72/044
(Continued)

FOREIGN PATENT DOCUMENTS

WO 2020/064027 A2 4/2020

OTHER PUBLICATIONS

Huawei et al.; Enhancements for simultaneous operation of MT and DU; 3GPP TSG RAN WG1 Meeting #103-e; R1-2007595; Oct. 26, 2020-Nov. 13, 2020; E-meeting.
(Continued)

*Primary Examiner* — Jay P Patel
(74) *Attorney, Agent, or Firm* — Jefferson IP Law, LLP

(57) ABSTRACT

A method and apparatus for transmitting signals via a backhaul link between a parent integrated access and backhaul (IAB) node and a child IAB node by an IAB node including an integrated access and backhaul mobile termination (IAB-MT) and an integrated access and backhaul distributed unit (IAB-DU) in a wireless communication system are provided. The method includes receiving, from the parent IAB node, signaling information indicating a timing scheme to be applied for the IAB-MT, and in case that the indicated timing scheme is a first timing scheme in which a transmission timing of the IAB MT coincides with a transmission timing of the IAB DU, transmitting a signal in a backhaul uplink to the parent IAB node by the IAB-MT, and transmitting a signal in a backhaul downlink to the child IAB node by the IAB-DU, wherein the transmission timing at which the IAB-MT transmits the signal and the transmission timing at which the IAB-DU transmits the signal are set identically.

8 Claims, 10 Drawing Sheets

(56) References Cited

U.S. PATENT DOCUMENTS

| | | | | |
|---|---|---|---|---|
| 11,418,375 | B2* | 8/2022 | You | H04L 27/2602 |
| 11,516,063 | B2* | 11/2022 | You | H04L 5/0048 |
| 11,528,173 | B2* | 12/2022 | You | H04L 27/2613 |
| 11,595,927 | B2* | 2/2023 | Abedini | H04L 27/2607 |
| 11,838,151 | B1* | 12/2023 | Jones | H04L 25/0224 |
| 12,101,274 | B2* | 9/2024 | Go | H04L 5/0053 |
| 2020/0015316 | A1 | 1/2020 | Islam et al. | |
| 2020/0128539 | A1* | 4/2020 | Abedini | H04W 56/0045 |
| 2020/0145965 | A1 | 5/2020 | Luo et al. | |
| 2021/0084606 | A1* | 3/2021 | Abedini | H04W 56/0025 |
| 2021/0212070 | A1* | 7/2021 | Luo | H04W 72/1263 |
| 2021/0251043 | A1* | 8/2021 | Abedini | H04W 88/14 |
| 2021/0273836 | A1* | 9/2021 | Luo | H04W 76/27 |
| 2021/0298036 | A1* | 9/2021 | Luo | H04W 72/535 |
| 2021/0298064 | A1* | 9/2021 | Luo | H04W 72/23 |
| 2021/0321397 | A1* | 10/2021 | Abedini | H04W 16/14 |
| 2022/0039110 | A1* | 2/2022 | Takeda | H04W 72/0446 |
| 2022/0070809 | A1* | 3/2022 | Song | H04W 72/20 |
| 2022/0131733 | A1* | 4/2022 | You | H04W 88/04 |
| 2022/0166587 | A1* | 5/2022 | Go | H04L 1/1864 |
| 2022/0201696 | A1* | 6/2022 | Go | H04W 72/51 |
| 2023/0309040 | A1* | 9/2023 | Kurita | H04W 56/005 |
| 2023/0403664 | A1* | 12/2023 | He | H04L 5/0048 |
| 2024/0049211 | A1* | 2/2024 | Eriksson | H04L 5/0055 |
| 2024/0064671 | A1* | 2/2024 | Huang | H04W 56/0015 |
| 2024/0064733 | A1* | 2/2024 | Ghanbarinejad | H04L 5/0094 |

OTHER PUBLICATIONS

Qualcomm Incorporated; On enhancements for simultaneous operation of IAB-node's child and parent links; 3GPP TSG RAN WG1 Meeting #103-e; R1-2009270; Oct. 26, 2020-Nov. 13, 2020.

International Search Report with Written Opinion dated Apr. 20, 2022; International Appln. No. PCT/KR2022/000662.

LG Electronics, Discussions on Other Enhancement for Simultaneous operation, R1-2008407, 3GPP TSG RAN WG1 #103-e, Oct. 24, 2020, XP051946655.

Huawei et al., Resource multiplexing between backhaul and access for IAB duplexing enhancements, R1-2007594, Oct. 24, 2020, XP051946435.

Extended European Search Report dated Jun. 5, 2024, issued in European Patent Application No. 22739723.9.

* cited by examiner

METHOD AND APPARATUS FOR PERFORMING COMMUNICATION FOR TRANSMISSION OF IAB NODE IN WIRELESS COMMUNICATION SYSTEM

CROSS-REFERENCE TO RELATED APPLICATION(S)

This application is based on and claims priority under 35 U.S.C. § 119(a) of a Korean patent application number 10-2021-0007107, filed on Jan. 18, 2021, in the Korean Intellectual Property Office, and of a Korean patent application number 10-2021-0126701, filed on Sep. 24, 2021, in the Korean Intellectual Property Office, the disclosure of each of which is incorporated by reference herein in its entirety.

BACKGROUND

1. Field

The disclosure relates to a wireless communication system. More particularly, the disclosure relates to a method and apparatus for performing communication in an integrated access and backhaul (IAB) node.

2. Description of Related Art

In order to meet the demand for wireless data traffic soaring since the $4^{th}$ generation (4G) communication system came to the market, there are ongoing efforts to develop enhanced $5^{th}$ generation (5G) communication systems or pre-5G communication systems. For the reasons, the 5G communication system or pre-5G communication system is called the beyond 4G network communication system or post long term evolution (LTE) system.

For higher data transmit rates, 5G communication systems are considered to be implemented on ultra-high frequency bands (millimeter (mm) Wave), such as, e.g., 60 GHz. To mitigate pathloss on the ultra-high frequency band and increase the reach of radio waves, the following techniques are taken into account for the 5G communication system: beamforming, massive multi-input multi-output (MIMO), full dimensional MIMO (FD-MIMO), array antenna, analog beamforming, and large scale antenna.

Also being developed are various technologies for the 5G communication system to have an enhanced network, such as evolved or advanced small cell, cloud radio access network (cloud RAN), ultra-dense network, device-to-device (D2D) communication, wireless backhaul, moving network, cooperative communication, coordinated multi-point (CoMP), and interference cancellation.)

There are also other various schemes under development for the 5G system including, e.g., hybrid frequency shift keying (FSK) and quadrature amplitude modulation (QAM) (FQAM) and sliding window superposition coding (SWSC), which are advanced coding modulation (ACM) schemes, and filter bank multi-carrier (FBMC), non-orthogonal multiple access (NOMA) and sparse code multiple access (SCMA), which are advanced access schemes.

The Internet is evolving from the human-centered connection network by which humans create and consume information to the Internet of Things (IoT) network by which information is communicated and processed between things or other distributed components. Another arising technology is the Internet of Everything (IoE), which is a combination of the Big data processing technology and the IoT technology through, e.g., a connection with a cloud server.

To implement the IoT, technology elements, such as a sensing technology, wired/wireless communication and network infra, service interface technology, and a security technology, are required. There is a recent ongoing research for inter-object connection technologies, such as the sensor network, Machine-to-Machine (M2M), or the Machine-Type Communication (MTC).

In the IoT environment may be offered intelligent Internet Technology (IT) services that collect and analyze the data generated by the things connected with one another to create human life a new value. The IoT may have various applications, such as the smart home, smart building, smart city, smart car or connected car, smart grid, health-care, or smart appliance industry, or state-of-art medical services, through conversion or integration of existing information technology (IT) techniques and various industries.

Accordingly, various attempts are being made to apply the 5G communication system to IoT. For example, 5G communication technologies such as sensor networks, M2M, and MTC are implemented by techniques including beamforming, MIMO, and array antenna. Application of a cloud RAN as the big data processing technology described above may be considered to be an example of convergence between the 5G technology and the IoT technology.

Recently, various studies have been made to utilize integrated access and backhaul (IAB) technology, and accordingly, there is a need for improving dual access of an IAB node.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a communication method and apparatus for efficient transmission of an integrated access and backhaul (IAB) node in a wireless communication system.

Another aspect of the disclosure is to provide a communication method and apparatus for efficient transmission of an IAB node which is a radio access network (RAN) node supporting a new radio (NR) backhaul link for an IAB node, different from an NR access link for a user equipment (UE) in a wireless communication system.

Another aspect of the disclosure is to provide a communication method and apparatus in a wireless communication system, in which a distributed unit (DU) and a mobile termination (MT) included in an IAB node simultaneously transmit signals in different resources to a parent IAB node or a child IAB node.

Another aspect of the disclosure is to provide a communication method and apparatus of an IAB node in a wireless communication system, which facilitate interference cancellation in a parent IAB node and a child IAB node, when the parent IAB node and the child IAB node receive signals that the IAB node transmits simultaneously in different resources.

Another aspect of the disclosure is to provide a communication method and apparatus in a wireless communication system, which align slot timings between a DU and an MT included in an IAB node during signal transmissions of the DU and the MT.

Additional aspects will be set forth in part in the description which follows and, in part, will be apparent from the description, or may be learned by practice of the presented embodiments.

In accordance with an aspect of the disclosure, a method for transmitting signals via a backhaul link between a parent IAB node and a child IAB node by an IAB node including an integrated access and backhaul mobile termination (IAB-MT) and an integrated access and backhaul distributed unit (IAB-DU) in a wireless communication system is provided. The method includes receiving, from the parent IAB node, signaling information indicating a timing scheme to be applied for the IAB-MT, in case that the indicated timing scheme is a first timing scheme in which a transmission timing of the IAB MT coincides with a transmission timing of the IAB DU, transmitting a signal in a backhaul uplink to the parent IAB node by the IAB-MT and transmitting a signal in a backhaul downlink to the child IAB node by the IAB-DU, wherein the transmission timing at which the IAB-MT transmits the signal and the transmission timing at which the IAB-DU transmits the signal are set identically.

In accordance with another aspect of the disclosure, an IAB node for transmitting signals via a backhaul link between a parent IAB node and a child IAB node in a wireless communication system is provided. The IAB node includes an IAB-MT configured to receive, from the parent IAB node, signaling information indicating a timing scheme to be applied for the IAB-MT, and transmit a signal in a backhaul uplink to the parent IAB node, and an IAB-DU configured to transmit a signal in a backhaul downlink to the child IAB node, wherein, in case that the indicated timing scheme is a first timing scheme in which a transmission timing of the IAB MT coincides with a transmission timing of the IAB DU, the transmission timing at which the IAB-MT transmits the signal and the transmission timing at which the IAB-DU transmits the signal are set identically.

In accordance with another aspect of the disclosure, an IAB node for transmitting signals via a backhaul link between a parent IAB node and a child IAB node in a wireless communication system is provided. The IAB node includes at least one transceiver, and a controller coupled with the at least one transceiver and configured to receive, from the parent IAB node, signaling information indicating a timing scheme to be applied, and in case that the indicated timing scheme is a first timing scheme in which a transmission timing of an IAB MT of the IAB node coincides with a transmission timing of an IAB DU of the IAB node, transmit a signal in a backhaul uplink to the parent IAB node and transmit a signal in a backhaul downlink to the child IAB node, wherein the transmission timing at which the IAB-MT transmits the signal and the transmission timing at which the IAB-DU transmits the signal are set identically.

In accordance with another aspect of the disclosure, a method for receiving a signal via a backhaul link between a parent IAB node and an IAB node by the parent IAB node in a wireless communication system is provided. The method includes transmitting, to the IAB node including an IAB-MT and an IAB-DU, signaling information indicating a timing scheme to be applied for the IAB node, in case that the indicated timing scheme is a first timing scheme in which a transmission timing of the IAB MT coincides with a transmission timing of the IAB DU, receiving the signal via the backhaul link from the IAB-MT, wherein transmission timings of the IAB-MT and the IAB-DU are set identically based on the signaling information.

In accordance with another aspect of the disclosure, a parent integrated access and backhaul (IAB) node for receiving a signal via a backhaul link between the parent IAB node and an IAB node in a wireless communication system is provided. The parent IAB node includes at least one transceiver, and a controller coupled with the at least one transceiver and configured to transmit, from the IAB node including an IAB-MT and an IAB-DU, signaling information indicating a timing scheme to be applied for the IAB node, and in case that the indicated timing scheme is a first timing scheme in which a transmission timing of the IAB MT coincides with a transmission timing of the IAB DU, receive the signal via the backhaul link from the IAB-MT, wherein transmission timings of the IAB-MT and the IAB-DU are set identically based on the signaling information.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

Figure 1:
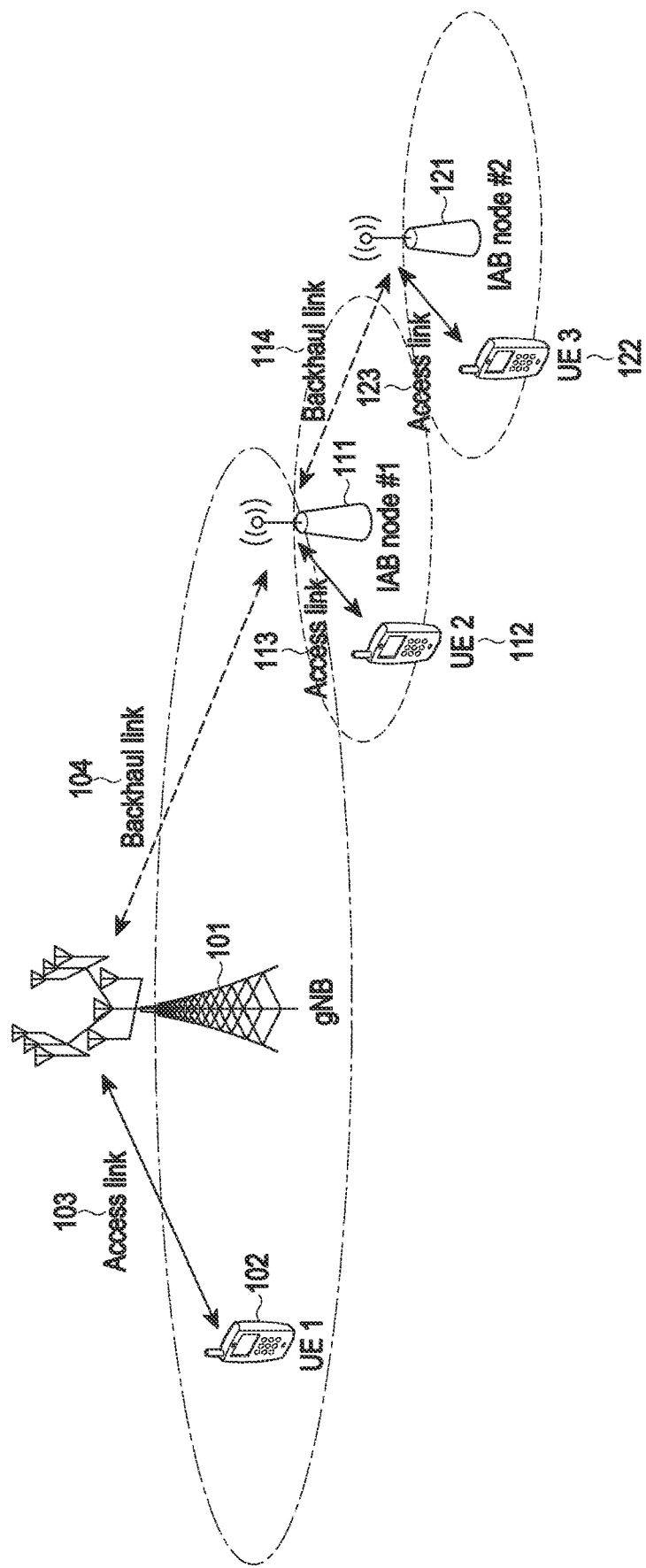
FIG. 1 is a diagram illustrating a wireless communication system in which an integrated access and backhaul (IAB) node operates according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In describing embodiments herein, techniques which are known in the technical field of the disclosure and are not directly related to the disclosure will not be described. This is intended to clearly convey the subject matter of the disclosure without obscurity by avoiding an unnecessary description.

For the same reason, some components shown in the drawings are exaggerated, omitted, or schematically illustrated, and the drawn size of each component does not exactly reflect its real size. In each drawing, the same reference numerals are assigned to the same or corresponding components.

The advantages and features of the disclosure, and a method of achieving them will become apparent from reference to embodiments described below in detail in conjunction with the attached drawings. However, the disclosure may be implemented in various manners, not limited to the embodiments set forth herein. Rather, these embodiments are provided such that the disclosure is complete and thorough and its scope is fully conveyed to those skilled in the art, and the disclosure is only defined by the appended claims. The same reference numerals denote the same components throughout the specification.

It will be understood that each block of the flowchart illustrations and/or block diagrams, and combinations of blocks in the flowchart illustrations and/or block diagrams can be implemented by computer program instructions. These computer program instructions may be loaded on a processor of a general purpose computer, special purpose computer, or other programmable data processing equipment, such that the instructions, which are executed via the processor of the computer or other programmable data processing equipment, create means for implementing the functions/acts specified in the flowchart and/or block diagram block(s). These computer program instructions may also be stored in a computer-usable or computer-readable memory that can direct the computer or other programmable data processing equipment to function in a particular manner, such that the instructions stored in the computer-usable or computer-readable memory produce an article of manufacture including instruction means which implement the function/act specified in the flowchart and/or block diagram block(s). The computer program instructions may also be loaded onto the computer or other programmable data processing equipment to cause a series of operations to be performed on the computer or other programmable data processing equipment to produce a computer implemented process such that the instructions which are executed on the computer or other programmable equipment provide operations for implementing the functions/acts specified in the flowchart and/or block diagram block(s).

Furthermore, the respective block diagrams may illustrate parts of modules, segments, or codes including one or more executable instructions for performing specific logic function(s). Moreover, it should be noted that the functions of the blocks may be performed in a different order in several modifications. For example, two successive blocks may be performed substantially at the same time, or may be performed in reverse order according to their functions.

The term "unit" as used herein means, but is not limited to, a software or hardware component, such as a field programmable gate array (FPGA) or application specific integrated circuit (ASIC), which performs certain tasks. A unit may advantageously be configured to reside on an addressable storage medium and configured to be executed on one or more processors. Thus, a unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided in the components and "units" may be combined into fewer components and "units" or further separated into additional components and "units". In addition, the components and "units" may be implemented such that they are executed on one or more central processing units (CPUs) in a device or a secure multimedia card.

Beyond the initial voice-centered services, wireless communication systems have been developed to provide high-speed, high-quality packet data services, such as communication standards including, for example, High Speed Packet Access (HSPA), Long Term Evolution (LTE) (or Evolved Universal Terrestrial Radio Access (E-UTRA)), LTE-Advanced (LTE-A), and LTE-Pro of the 3rd Generation Partnership Project (3GPP), and High Rate Packet Data (HRPD), Ultra Mobile Broadband (UMB), and Institute of Electrical and Electronics Engineers (IEEE) 802.16e of the 3GPP2.

The LTE system, which is a major example of the wideband wireless communication systems, adopts orthogonal frequency division multiplexing (OFDM) for downlink (DL) and single carrier frequency division multiple access (SC-FDMA) for uplink (UL). A UL refers to a radio link on which a user equipment (UE) (terminal or mobile station (MS)) transmits data or a control signal to a next generation Node B (gNB) (or eNode B or base station (BS)), and a DL refers to a radio link on which a gNB transmits data or a control signal to a UE. In the multiple access scheme, data or control information for different users are distinguished from each other by allocating and managing time-frequency resources without overlap, that is, with orthogonality between them, for transmission of the data or the control information for the users.

Because a beyond LTE communication system, that is, a 5th generation (5G) (or New Radio (NR)) system should freely reflect various requirements from users and service providers, services satisfying the various requirements simultaneously should be supported. Services considered for the 5G communication system include enhanced Mobile BroadBand (eMBB), massive Machine Type Communication (mMTC), and Ultra Reliability Low Latency Communication (URLLC).

eMBB aims to provide much higher data rates than those supported by legacy LTE, LTE-A, or LTE-Pro. For example, the 5G communication system should be able to provide up to 20 Gbps on DL and up to 10 Gbps on UL, from the perspective of a single gNB. Besides the maximum data rates, the 5G communication system should provide an increased user-perceived data rate. To satisfy these requirements, various transmission and reception techniques need to be advanced, including multiple input multiple output (MIMO). While a signal is transmitted in a transmission bandwidth of up to 20 MHz at 2 GHz used in the current LTE, a wider frequency bandwidth than 20 MHz at 3 to 6 GHz or above 6 GHz is used in the 5G communication system, thereby satisfying the data rates required in the 5G communication system.

Further, mMTC is considered to support an application service such as Internet of Things (IoT) in the 5G communication system. For efficient IoT, mMTC requires support of access from a large number of UEs within a cell, advanced coverage of UEs, an increased battery lifetime, and cost reduction of the UEs. IoT devices execute a communication function by being attached to various sensors and devices, and thus should be able to support a huge number of UEs (e.g., 1,000,000 UEs/km$^2$). Further, because an mMTC-enabled UE is highly likely to be placed in a shadowing area which is not covered by a cell, such as the basement of a building, in view of the nature of the service, the mMTC-enabled UE requires wider coverage than in other services. The mMTC-enabled UE should be a low-price one and have a very long battery lifetime such as 10 to 15 years because its battery is difficult to often replace.

Finally, URLLC is a mission-critical cellular-based wireless communication service. For example, URLLC may be considered as a service used for remote control of robots or machinery, industrial automation, unmanned aerial vehicles, remote health care, and emergency alert. Accordingly, URLLC should provide communication with a very low latency and very high reliability. For example, a service supporting URLLC should satisfy an air interface latency less than 0.5 milliseconds and has a packet error rate requirement of $10^{-5}$ or less. Therefore, for a service supporting URLLC, the 5G system should be designed to provide a smaller transmission time interval (TTI) than for other services and allocate wide resources in a frequency band to secure the reliability of a communication link.

The three services of the 5G system, that is, eMBB, URLLC, and mMTC may be multiplexed in a single system. To satisfy different requirements of the services, different transmission and reception techniques and different transmission and reception parameters may be used for the services.

In the 5G system, when a gNB transmits and receives data to and from a UE in the above 6 GHz band, particularly the millimeter wave (mmWave) band as well as 3 to 6 GHz band, coverage may be limited due to propagation path attenuation. Although problems caused by the limited coverage may be solved by densely deploying a plurality of relays (or relay nodes) in a propagation path between the gNB and the UE, much cost incurred in installing an optical cable for a backhaul connection between relays becomes a challenging issue. Accordingly, instead of installation of an optical cable between relays, use of wideband radio frequency resources available in mmWave may lead to elimination of the problem of cost in installing an optical cable and more efficient use of the mmWave band.

As described above, a technique of transmitting and receiving backhaul data to and from a gNB and finally transmitting and receiving the data as access data to and from a UE through at least one relay node in mmWave as well as 3 to 6 GHz band is called integrated access and backhaul (IAB). The relay node that transmits and receives data to and from the gNB through a wireless backhaul is called an IAB node. The gNB (or BS, also called an IAB donor) includes a central unit (CU) and a distributed unit (DU), and the IAB node includes a DU and a mobile termination (MT). The CU manages the DUs of all IAB nodes connected to the gNB over multiple hops.

The IAB node uses different frequency bands or the same frequency band, when receiving backhaul data from the gNB and transmitting access data to the UE, and when receiving access data from the UE and transmitting backhaul data to the BS. When using the same frequency band, the IAB node has a unidirectional transmission/reception property (half-duplex constraint) at one instant. Accordingly, to reduce a transmission/reception delay caused by the unidirectional transmission/reception property of the IAB node, the IAB node may multiplex backhaul data (e.g., on the assumption that a parent IAB node, the IAB node acting as a relay node, and a child IAB node are connected through radio backhaul links, DL data from the DU of the parent IAB node to the MT of the IAB node and UL data from the MT of the child IAB node to the DU of the IAB node) and access data from a UE (UL data from the UE to the IAB node) (e.g., in frequency division multiplexing (FDM) and/or spatial division multiplexing (SDM)) during reception. For the relationship between the parent node and the IAB node and the relationship between the child node and the IAB node, 3GPP TS 38.300 section 4.7 Integrated Access and Backhaul may be referred to. During transmission, the IAB node may also multiplex backhaul data (UL data from the MT of the IAB node to the DU of the parent IAB node and DL data from the DU of the IAB node to the MT of the child IAB node) and access data to the UE (DL data from the IAB node to the UE) (in FDM and/or SDM).

When the DU of the parent IAB node receives a signal from the MT of the IAB node, transmission from the DU of the IAB node to the MT of the child IAB node may interfere with the signal reception at the DU of the parent IAB node. In addition, when the MT of the child IAB node receives a signal from the DU of the IAB node, transmission from the MT of the IAB node to the DU of the parent IAB node may interfere with the signal reception at the MT of the child IAB node.

To cancel interference during simultaneous transmissions from the MT and DU of the IAB node, a method of aligning slot timings between simultaneous transmissions from the DU and MT of an IAB node is applied so that interference with reception at the DU of the parent IAB node may be uniform across all symbols of a DU slot in the disclosure. Further, interference with reception at the MT of the child IAB node may be uniform across all symbols of an MT slot.

In this case, since the influence of the interference on the entire DU slot or MT slot is the same, a signal in the slot may be recovered by estimating interference in a specific symbol of the DU slot of the parent IAB node or the MT slot of the child IAB nod and canceling the estimated interference in all symbols of the DU slot of the IAB node or the MT slot of the child IAB node. Accordingly, the disclosure proposes a method of applying the same transmission timing according to a unidirectional transmission/reception property in the case of simultaneous transmissions as described above, and a related operation of an IAB node.

FIG. 1 is a diagram illustrating a wireless communication system in which IAB nodes operate according to an embodiment of the disclosure.

Referring to FIG. 1, a gNB 101 is a typical BS (e.g., eNB or gNB) and may also be referred to as an eNB, a BS, a donor gNB, or a donor IAB in the disclosure. A first IAB node (IAB node #1) 111 and a second IAB node (IAB node #2) 121 are IAB nodes that transmit and receive signals on a backhaul link 114 in the mmWave band as well as 3 to 6 GHz band. A first UE (UE 1) 102 transmits and receives access data to and from the gNB 101 on an access link 103. IAB node #1 111 transmits and receives backhaul data to and from the gNB 101 on a backhaul link 104. A second UE (UE 2) 112 transmits and receives access data to and from IAB node #1 111 on an access link 113. IAB node #2 121 transmits and receives backhaul data to and from IAB node #1 111 on the backhaul link 114. Accordingly, IAB node #1 111 is a higher IAB node, also called a parent IAB node for IAB node #2 121, and IAB node #2 121 is a lower IAB node, also called a child IAB node for IAB node #1 111. A third UE (UE 3) 122 transmits and receives access data to and from IAB node #2 121 on an access link 123. In FIG. 1, the backhaul links 104 and 114 may be radio backhaul links.

Now, a description will be given of measurement of an IAB node or a donor gNB at a UE.

To enable UE 2 112 or UE 3 122 to perform measurement on the neighboring donor gNB or IAB node other than the serving IAB node, coordination may be required between the donor gNB and the IAB nodes. That is, the donor gNB may match measurement resources between IAB nodes having even-numbered hop orders or measurement resources between IAB nodes having odd-numbered hop orders, so that the UE may perform measurement on the neighboring IAB node or gNB with minimal resource consumption. The UE may receive configuration information instructing the UE to measure a synchronization signal block (SSB)/physical broadcast channel (PBCH) or a channel state information reference signal (CSI-RS) for measurement of the neighboring IAB node from the serving IAB node or gNB by higher-layer signaling (higher-layer signal). When the UE is configured to measure the neighboring gNB through the SSB/PBCH (which may also be referred to as "SS/PBCH" or "SSB"), the UE may be configured with two SS/PBCH measurement timing configurations (SMTCs) per frequency, for measurement resources for an IAB node having an even-numbered hop order or an IAB node having an odd-numbered hop order. Upon receipt of the configuration information, the UE may measure the IAB node having the even-numbered hop order in one of the SMTCs, and measure the IAB node having the odd-numbered hop order in the other SMTC.

Measurement of another IAB node at an IAB node or a donor gNB will be described below.

To enable an IAB node to perform measurement on a neighboring donor gNB or IAB node, coordination may be required between the donor gNB and the IAB nodes. That is, the donor gNB may match measurement resources between IAB nodes having even-numbered hop orders or measurement resources between IAB nodes having odd-numbered hop orders, so that the IAB node may perform measurement on the neighboring IAB node or IAB gNB with minimal resource consumption. The IAB node may receive configuration information instructing the IAB node to measure an SS/PBCH or a CSI-RS for measurement of the neighboring IAB node from the serving IAB node or gNB by higher-layer signaling. When the IAB node is configured to measure the neighboring gNB through the SS/PBCH, the IAB node may be configured with two SMTCs per frequency, for measurement resources for an IAB node having an even-numbered hop order or an IAB node having an odd-numbered hop order. Upon receipt of the configuration information, the IAB node may measure the IAB node having the even-numbered hop order in one of the SMTCs, and measure the IAB node having the odd-numbered hop order in the other SMTC.

With reference to FIGS. 2A, 2B, 3A, 3B, 4A, and 4B, multiplexing of a backhaul link between a gNB and an IAB node or between IAB nodes and an access link between a gNB and a UE or between an IAB node and a UE in radio resources according to the IAB technology proposed by the disclosure will be described below in detail.

Figure 2A:
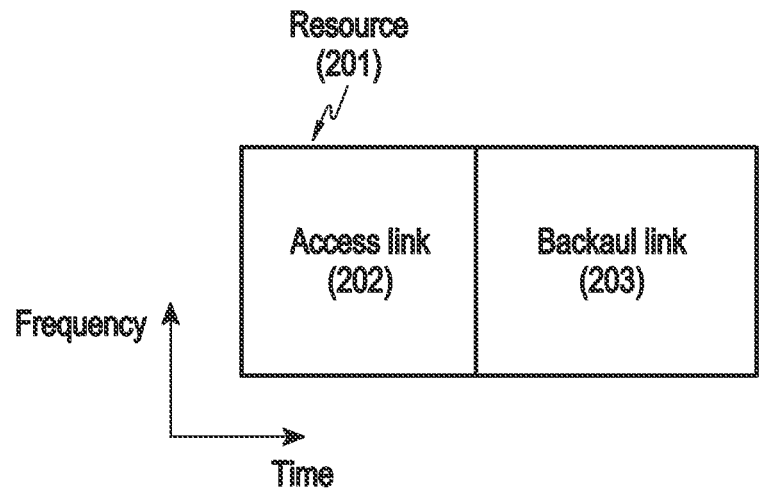
FIGS. 2A and 2B are diagrams illustrating time division multiplexing (TDM) and frequency division multiplexing (FDM) between an access link and a backhaul link of an IAB node, respectively, according to various embodiments of the disclosure.
Figure 2B:
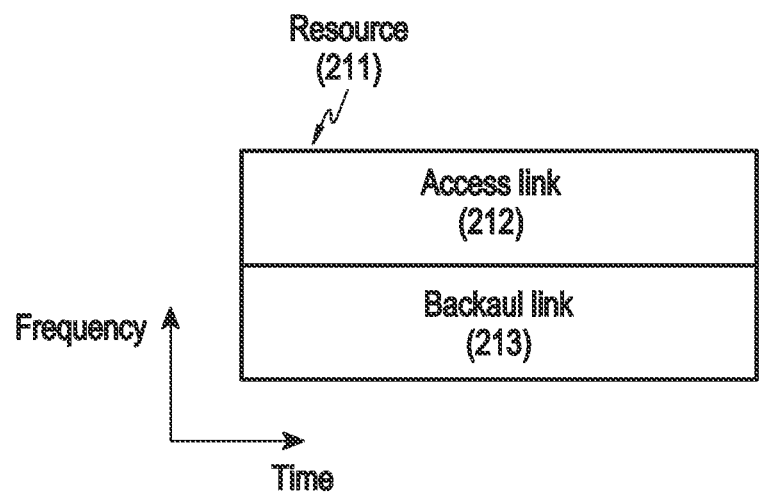

FIGS. 2A and 2B are diagrams illustrating examples of resource multiplexing between an access link and a backhaul link in an IAB node according to various embodiments of the disclosure.

FIG. 2A is a diagram illustrating an example of time division multiplexing (TDM) of resources between an access link and a backhaul link in an IAB node. FIG. 2B is a diagram illustrating an example of frequency division multiplexing (FDM) of resources between an access link and a backhaul link in an IAB node.

Referring to FIG. 2A, a backhaul link 203 between a gNB and an IAB node or between IAB nodes and an access link 202 between the gNB and a UE or between an IAB node and the UE are multiplexed in TDM in radio resources 201. Therefore, when resources are multiplexed between the access link and the backhaul link in TDM in an IAB node as illustrated in FIG. 2A, data is not transmitted and received between the gNB and the IAB nodes in a time area in which the gNB or the IAB nodes transmit and receive data to and from the UE, and the gNB or the IAB nodes do not transmit and receive data to and from the UE in a time area in which data is transmitted and received between the gNB and the IAB nodes.

Referring to FIG. 2B, a backhaul link 213 between a gNB and an IAB node or between IAB nodes and an access link 212 between the gNB and a UE or between an IAB node and the UE are multiplexed in FDM in radio resources 211. Therefore, although data may be transmitted and received between the gNB and the IABs in a time area in which the gNB or the IAB nodes transmit and receive data to and from the UE, only data transmissions in the same direction are possible due to the unidirectional transmission/reception property of the IAB nodes. For example, a first IAB node may only receive backhaul data from another IAB node or a gNB in a time area in which the first IAB node receives data from a UE. In addition, the first IAB node may only transmit backhaul data to the other IAB node or the gNB in a time area in which the first IAB node transmits data to the UE.

While only TDM and FDM have been described as multiplexing schemes in the examples of FIGS. 2A and 2B, spatial division multiplexing (SDM) is also available between an access link and a backhaul link. Therefore, although transmissions/receptions may be performed in SDM on the access link and the backhaul link, only data transmissions in the same direction are possible in SDM in view of the unidirectional transmission/reception property of IAB nodes as in FDM illustrated in FIG. 2B. For example, the first IAB node may only receive backhaul data from the other IAB node or the gNB in a time area in which the first IAB node receives data from the UE. In addition, the first IAB node may only transmit backhaul data to the other IAB node or the gNB in a time area in which the first IAB node transmits data to the UE.

The IAB node may transmit information indicating which one of TDM, FDM, and SDM is used in capability information about the multiplexing scheme to the gNB or a higher IAB node (e.g., parent IAB node), when the IAB node initially accesses the gNB or the higher IAB node. Alternatively, the IAB node may later receive the information indicating which one of TDM, FDM, and SDM is used from the gNB or the higher IAB node by higher-layer signaling (higher-layer signal) such as system information or radio resource control (RRC) information. Alternatively, after the initial access, the IAB node may receive the information indicating which one of TDM, FDM, and SDM is used from the gNB or the higher-layer IAB node on a backhaul link. Alternatively, after transmitting the capability information to the gNB or the higher IAB node, a determination as to which multiplexing scheme is to be used may depend on implementation of the IAB, and the IAB node may report a multiplexing scheme to be used in a specific slot or radio frame for a specific time period or continuously to the gNB or the higher IAB node by backhaul or higher-layer signaling.

While the multiplexing schemes between an access link and a backhaul link have been mainly described in the examples of FIGS. 2A and 2B, the same multiplexing schemes may be applied between backhaul links. For example, the MT (backhaul link) and DU (backhaul link or access link) of one IAB node may be multiplexed in the methods described in the examples of FIGS. 2A and 2B, as described below.

Figure 3A:
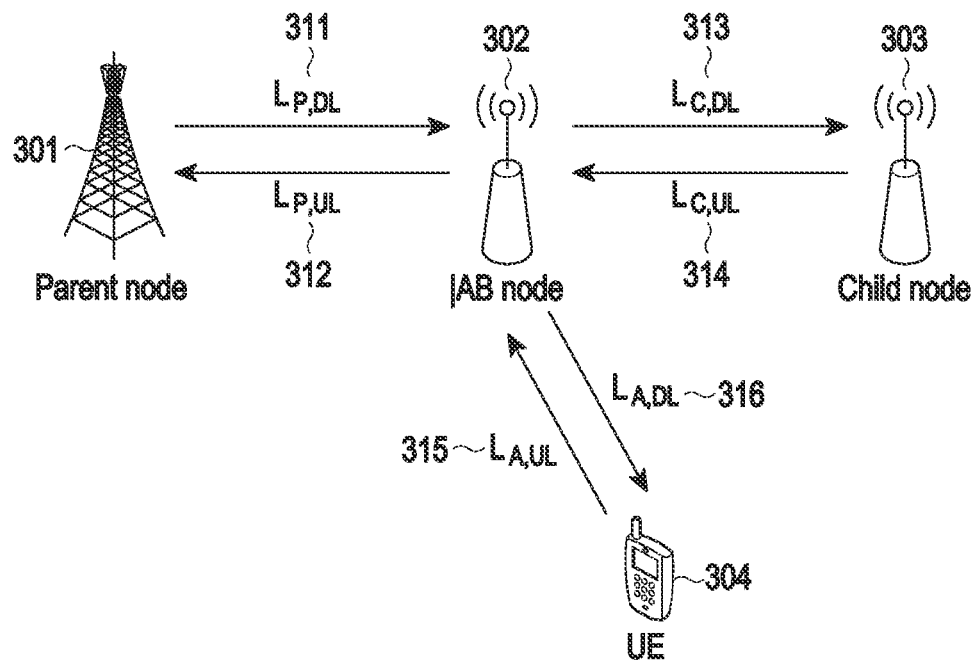
FIGS. 3A and 3B are diagrams illustrating TDM between an access link and a backhaul link of an IAB node according to various embodiments of the disclosure.
Figure 3B:
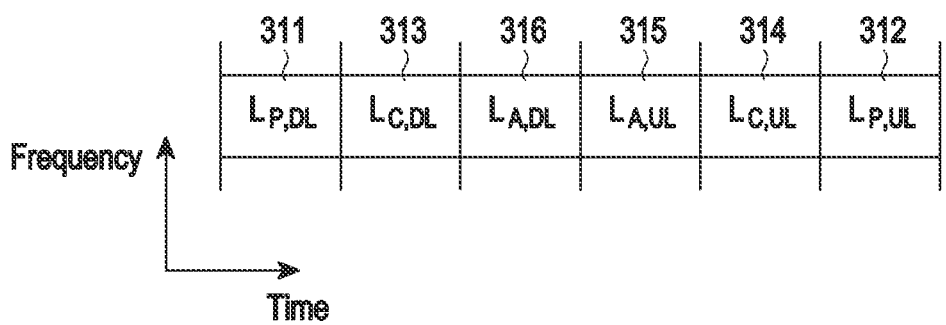

FIGS. 3A and 3B are diagram illustrating an example of TDM between an access link and a backhaul link in resources in an IAB node according to various embodiments of the disclosure.

FIG. 3A illustrates a process of communicating with a parent node 301, a child IAB node 303, and a UE 304 by an IAB node 302. Links among the nodes will be described in more detail. The parent node 301 transmits a backhaul DL signal to the IAB node 302 on a backhaul downlink $L_{P,DL}$ 311, and the IAB node 302 transmits a backhaul UL signal to the parent node 301 on a backhaul UL $L_{P,UL}$ 312. The IAB node 302 transmits an access DL signal to the UE 304 on an access DL $L_{A,DL}$ 316, and the UE 304 transmits an access UL signal to the IAB node 302 on an access UL $L_{A,UL}$ 315. The IAB node 302 transmits a backhaul DL signal to the child IAB node 303 on a backhaul DL $L_{C,DL}$ 313, and the child IAB node 303 transmits a backhaul UL signal to the IAB node 302 on a backhaul UL $L_{C,UL}$ 314. In the example of FIGS. 3A and 3B, the subscript P means a backhaul link with a parent, the subscript A means an access link with a UE, and the subscript C means a backhaul link with a child.

The link relationship of FIG. 3A has been described from the perspective of the IAB node 302. From the perspective of the child IAB node 303, the parent node is the IAB node 302, and another lower child IAB node may exist for the child IAB node 303. From the perspective of the parent node 301, the child node is the IAB node 302, and another IAB parent node may exist above the parent node 301.

Each of the backhaul UL/DL signal and the access UL/DL signal may include at least one of data and control information, a channel carrying the data and the control information, a reference signal (RS) required to decode the data and the control information, or an RS required to obtain channel information.

FIG. 3B illustrates an example of multiplexing all of the above links in TDM. In the example of 3B, the backhaul DL $L_{P,DL}$ 311, the backhaul DL $L_{C,DL}$ 313, the access DL $L_{A,DL}$ 316, the access UL $L_{A,UL}$ 315, the backhaul UL $L_{C,UL}$ 314, and the backhaul UL $L_{P,UL}$ 312 are multiplexed in time order. The precedence relation of the links in the example of FIGS. 3A and 3B is an example, and any other precedence relation may also be applied.

Since the links are multiplexed in TDM in time order, this is the most time-consuming multiplexing scheme to transmit a signal from the parent node 301 through the IAB node 302 to the child IAB node 303 and to the UE 304. Therefore, to reduce latency in transmitting a signal from the parent node 301 finally to the UE 304, a method of multiplexing between the backhaul links or between the backhaul links and the access links in FDM or SDM, for transmissions at the same time may be considered.

Figure 4A:
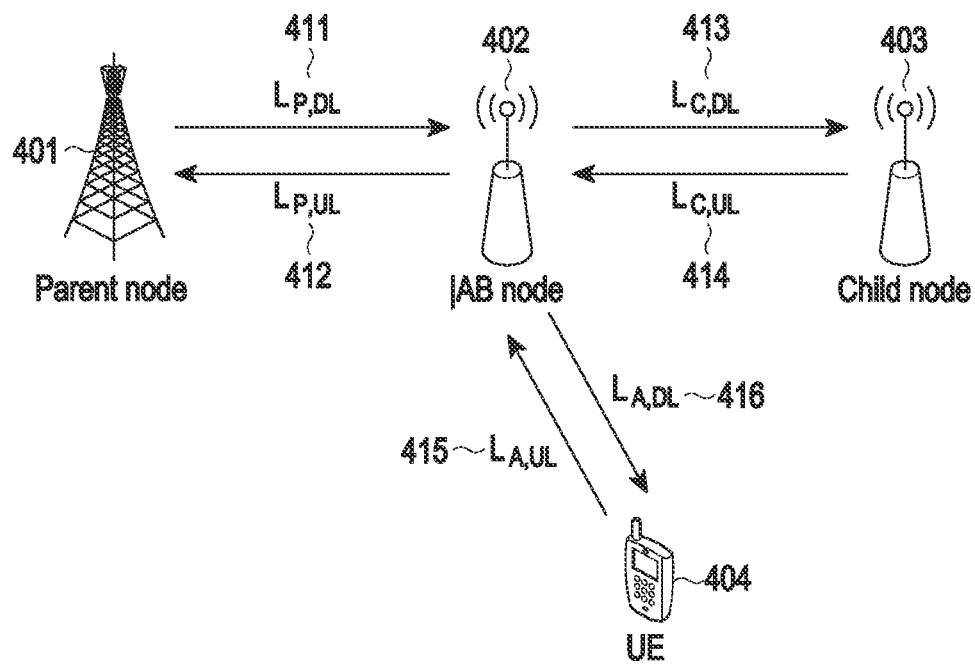
FIGS. 4A and 4B are diagrams illustrating FDM and spatial division multiplexing (SDM) between an access link and a backhaul link of an IAB node according to various embodiments of the disclosure.
Figure 4B:
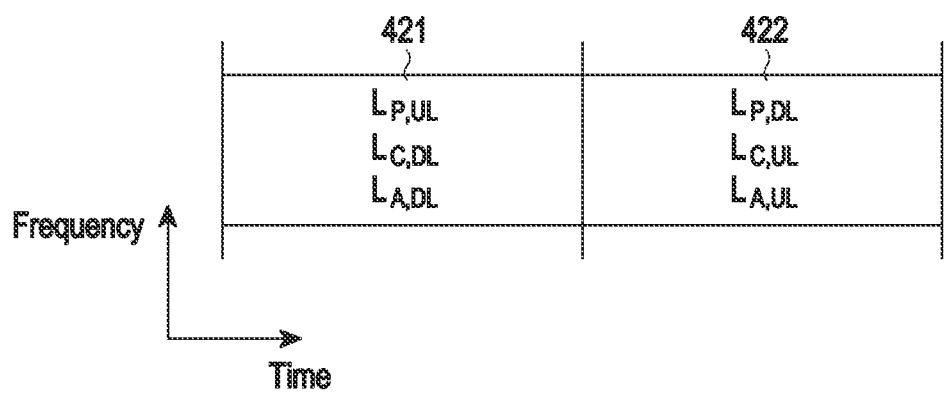

FIGS. 4A and 4B are diagrams illustrating an example of FDM and SDM between access links and backhaul links in an IAB node according to various embodiments of the disclosure.

Referring to FIGS. 4A and 4B, a method of reducing latency by multiplexing between backhaul links or between a backhaul link and an access link in FDM or SDM will be described.

Similarly to FIG. 3A, FIG. 4A illustrates a process of communicating with a parent node 401, a child IAB node 403, and a UE 404 by an IAB node 402. Links among the nodes will be described in more detail. The parent node 401 transmits a backhaul DL signal to the IAB node 402 on a backhaul DL $L_{P,DL}$ 411, and the IAB node 402 transmits a backhaul UL signal to the parent node 401 on a backhaul UL $L_{P,UL}$ 412. The IAB node 402 transmits an access DL signal to the UE 404 on an access DL $L_{A,DL}$ 416, and the UE 404 transmits an access UL signal to the IAB node 402 on an access UL $L_{A,UL}$ 415. The IAB node 402 transmits a backhaul DL signal to the child IAB node 403 on a backhaul DL $L_{C,DL}$ 413, and the child IAB node 403 transmits a backhaul UL signal to the IAB node 402 on a backhaul UL $L_{P,UL}$ 414. In the example of FIGS. 4A and 4B, the subscript P means a backhaul link with a parent, the subscript A means an access link with a UE, and the subscript C means a backhaul link with a child.

The link relationship of FIG. 4A is described from the perspective of the IAB node 402. From the perspective of the child IAB node 403, the parent node is the IAB node 402, and another child IAB node may exist below the child IAB node 403. From the perspective of the parent node 401, the child node is the IAB node 402, and another IAB parent node may exist above the parent node 401.

Each of the backhaul UL/DL signal and the access UL/DL signal may include at least one of data and control information, a channel carrying the data and the control information, an RS required to decode the data and the control information, or an RS required for obtaining channel information.

FIG. 4B illustrates an FDM or SDM.

As described above, since the IAB node has a unidirectional transmission/reception property at one instant, signals that may be multiplexed in FDM or SDM are limited. For example, in consideration of the unidirectional transmission/reception property of the IAB node 402, the backhaul UL $L_{P,UL}$ 412, the backhaul DL $L_{C,DL}$ 413, and the access DL $L_{A,DL}$ 416 may be multiplexed in a time area available for transmission from the IAB node 402. Accordingly, when the links are multiplexed in FDM or SDM, the IAB node 402 may transmit signals on all of the links in the same time area, as indicated by reference numeral 421. Further, the backhaul DL $L_{P,DL}$ 411, the backhaul UL $L_{C,UL}$ 414, and the access UL $L_{A,UL}$ 415 may be multiplexed in a time area available for reception at the IAB node 402. Accordingly, when the links are multiplexed in FDM or SDM, the IAB node 402 may receive signals on all of the links in the same time area, as indicated by reference numeral 422.

The multiplexing of links in the embodiment of FIGS. 4A and 4B is an example, and it is obvious that only two of the three links may be multiplexed in FDM or SDM. That is, the IAB node may transmit/receive a signal by multiplexing some of the links available for multiplexing.

Now, a description will be given of the structure of an IAB node.

Various types of gNB structures optimized for service requirements have been studied to support various services such as large-capacity transmission, low-latency and high-reliability transmission, or massive MTC and reduce capital expenditures (CAPEX) in the 5G system. In the 4G LTE system, a cloud RAN (C-RAN) structure has been commercialized, in which a radio processor and a radio transceiver (or remote radio head (RRH)) of a BS are separated and the radio processor is centralized, while only the radio transceiver resides at a cell site, in order to reduce CAPEX and efficiently control interference. In the C-RAN structure, when the radio processor of the BS transmits baseband digital in-phase and quadrature-phase (IQ) data to the radio transceiver, a common public radio interface (CPRI) optical link is generally used. When data is transmitted to the radio transceiver, a large data capacity is required. For example, 614.4 Mbps is required for 10-MHz Internet protocol (IP) data, and 1.2 Gbps is required for 20-MHz IP data. Therefore, a 5G RAN structure is designed such that a gNB is divided into a CU and a DU to reduce the enormous load of an optical link, and functional split is applied to the CU and the DU to have various structures. The 3GPP is working on standardization of various functional split options between the CU and the DU, and the functional split options split functions between protocol layers or within a protocol layer. There are a total of 8 options, Option 1 to Option 8. Among them, Option 2 and Option 7 are considered with priority in the current 5G gNB structure. In Option 2, the RRC layer and the packet data convergence protocol (PDCP) layer are located in the CU, and the radio link control (RLC) layer, the medium access control (MAC) layer, the physical (PHY) layer, and the radio frequency (RF) are located in the DU. In Option 7, the RRC, PDCP, RLC, MAC, and higher PHY layers are located in the CU, and the lower PHY layer is located in the DU. A structure with deployment flexibility for splitting and moving NR network protocols may be implemented between the CU and the DU through the above functional split. Flexible hardware implementation based on this structure provides a cost-effective solution, the CU-DU split structure enables load management, adjustment of real-time performance optimizations, and network functions virtualization (NFV)/software defined network (SDN), and the configurable functional split is applicable to various application examples (variable latency in transmission).

Accordingly, the structure of an IAB node in consideration of the above-described function split will be described with reference to FIG. 5.

Figure 5:
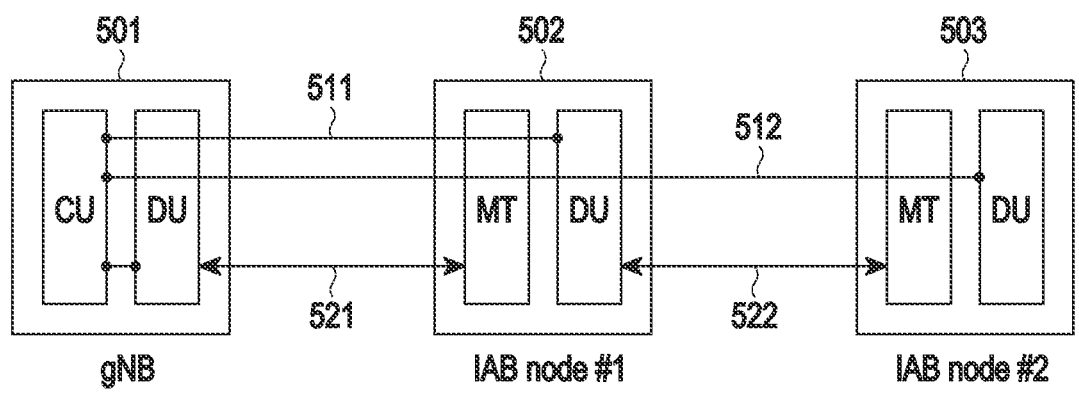
FIG. 5 is a diagram illustrating the structure of an IAB node according to an embodiment of the disclosure.

FIG. 5 is a diagram schematically illustrating the structure of an IAB node according to an embodiment of the disclosure.

Referring to FIG. 5, a gNB 501 includes a CU and a DU, and each of IAB nodes has a UE function (MT) for transmitting and receiving data to and from a parent node on a backhaul link and a gNB function (DU) for transmitting and receiving data to and from a child node on a backhaul link. In FIG. 5, IAB node #1 502 is wirelessly connected to the gNB 501 by one hop, and IAB node #2 503 is wirelessly connected to the gNB 501 via IAB node #1 502 by two hops.

Referring to FIG. 5, the CU of the gNB 501 may control the DUs of all IAB nodes wirelessly connected to the gNB 501, that is, IAB node #1 502 and IAB node #2 as well as the DU of the gNB 501, as indicated by reference numerals 511 and 512. The CU of the gNB 501 may allocate radio resources to the DUs so that the DUs transmit/receive data to/from the MTs of IAB nodes below the DUs. The radio resource allocations may be transmitted to the DUs via F1 application protocol (F1AP) interfaces by a higher-layer signal such as system information or RRC information or a physical-layer signal. For F1AP, 3GPP TS 38.473 may be referred to. The radio resources may include DL time resource, UL time resources, flexible time resources, and so on.

A radio resource configuration will be described in detail in the context of IAB node #2 503. The DL time resources are resources in which the DU of IAB node #2 503 transmits a DL control/data signal to the MT of a lower IAB node. The UL time resources are resources in which the DU of IAB node #2 503 receives a UL control/data signal from the MT of the lower IAB node. The flexible time resources are resources that may be utilized as DL time resources or UL time resources by the DU, and how the flexible time resources are used may be indicated to the MT of the lower IAB node by a DL control signal from the DU. Upon receipt of the DL control signal, the MT of the lower IAB node determines whether to use the flexible time resources as DL time resources or UL time resources. When the MT of the lower IAB node fails to receive the DL control signal, the MT of the lower IAB does not perform a transmission/reception operation. That is, the MT does not monitor or decode a DL control channel in the resources or does not measure a signal in the resources. The MT of the lower IAB node does not perform a transmission/reception operation in the resources. For the DL time resources, UL time resources, and flexible time resources, the CU may indicate two different types (or three different types including the time resources which are always unavailable) to the DU.

The first type is a soft type. The CU of the gNB 501 may configure soft-type DL time resources, UL time resources, and flexible time resources to the DU of IAB node #2 503 by F1AP (an interface between the CU and the DU). IAB node #1 502, which is a parent IAB (or the DU of the parent IAB) of IAB node #2 503 may explicitly (e.g., by a downlink control information (DCI) format) or implicitly indicate whether the configured soft-type resources are available or unavailable to IAB node #2 503 being a child IAB node (or the DU of the child IAB node). That is, when specific resources are indicated as available, the DU of IAB node #2 503 may use the resources for data transmission/reception to/from the MT of the lower IAB node. That is, the DU of IAB node #2 503 may perform a transmission when the resources are DL resources, and a reception when the resources are UL resources. When the resources are indicated as unavailable, IAB node #2 503 may not use the resources for data transmission/reception to/from the MT of the lower IAB node. That is, the DU of IAB node #2 503 may not transmit or receive a signal in the resources.

A method of indicating the availability of soft-type resources by a DCI format will be described in more detail. The DCI format in this embodiment may include an availability indicator for indicating the availability of one or more consecutive UL, DL, or flexible symbols.

To receive the DCI format, IAB node #2 503 may preliminarily receive information about the position of the availability indicator indicating availability for IAB node #2 in the DCI format, a table indicating the availability of time resources corresponding to a plurality of slots, or a mapping relationship of the availability indicator, together with the cell identifier (ID) of the DU of IAB node #2 503 from the CU or the parent IAB node by a higher-layer signal. Values (or indications) indicating the availability of consecutive UL symbols, DL symbols, or flexible symbols in one slot and the meanings of the values (or indications) may be configured as illustrated in Table 1 below.

TABLE 1

| Value | Indication |
|---|---|
| 0 | No indication of availability for soft symbols |
| 1 | DL soft symbols are indicated available<br>No indication of availability for UL and Flexible soft symbols |
| 2 | UL soft symbols are indicated available<br>No indication of availability for DL and Flexible soft symbols |
| 3 | DL and UL soft symbols are indicated available<br>No indication of availability for Flexible soft symbols |
| 4 | Flexible soft symbols are indicated available<br>No indication of availability for DL and UL soft symbols |
| 5 | DL and Flexible soft symbols are indicated available<br>No indication of availability for UL soft symbols |
| 6 | UL and Flexible soft symbols are indicated available<br>No indication of availability for DL soft symbols |
| 7 | DL, UL, and Flexible soft symbols are indicated available |

When IAB node #2 503 receives an indication of the above availability indicator in the DCI format from the parent IAB node, the DU of IAB node #2 503 may interpret the relationship between DL, UL, or flexible time resources configured for the IAB DU by the CU and the above-described availability in the following methods.

A first method is that the IAB DU expects that the number of values indicating availability included in the availability indicator of the DCI format is equal to the number of slots including a soft type configured with consecutive symbols configured by the CU. According to this method, the IAB DU may determine that the availability is applied only to the slots including the soft type.

A second method is that the IAB DU expects that the number of values indicating availability included in the availability indicator of the DCI format is equal to the number of all slots configured by the CU, that is, all slots including a hard/soft/non-available (NA) type. In this embodiment, the IAB DU may determine that the availability is applied only to slots including the soft type, and that the indicated availability is not applied to a slot including only the hard or NA type without the soft type.

In the first and second methods, the IAB DU may expect that the meaning of a value indicating the availability matches the DL resources, UL resources, or flexible resources configured by the CU. For example, when only DL soft resources or DL hard resources exist in a slot, the IAB DU may expect that only a value of 1 in Table 1 may be indicated. Therefore, the IAB node may expect that among the values in Table 1, values including the availability of UL soft resources are not indicated.

Further, the IAB DU may determine that at least for the flexible resources configured by the CU, it may also be indicated whether the flexible resources are used as DL resources or UL resources, in addition to a value indicating that the flexible resources are available. For example, in the case of flexible soft resources or flexible hard resources, the IAB node may expect that a value of 1 or 2 may be indicated, instead of a value of 4 in Table 1. In this case, the DU of IAB node #2 may determine that the flexible resources may be used only for UL or DL by an indication from the parent IAB node, rather than according to a determination of IAB node #2.

In addition, the IAB DU expects that the value of 0 in Table 1 may be indicated for any hard/soft or NA resources configured by the CU. In this case, the IAB DU determines that the hard/soft resources configured by the CU are not available, and until the DCI format indicates later that the resources are available, the resources are not available for data transmission and reception of the DU of IAB node #2 to and from the MT of the lower IAB node, like the resource type which is always unavailable, configured by the CU. Then, when the DCI format indicates that the resources are available again, the DU of IAB node #2 may use the resources as configured by the CU and indicated by the DCI format.

A second type is a hard type in which the above resources are always used between the DU and the MT. That is, when the resources are DL time resources, the DU of IAB node #2 may perform a transmission, and when the resources are UL resources, the DU of IAB node #2 may perform a reception, regardless of transmission and reception of the MT of IAB node #2. When the resources are flexible resources, the IAB DU may perform a transmission or reception according to a determination of the IAB DU (that is, according to the DCI format indicating to the MT of the lower IAB node whether the flexible resources are DL or UL resources).

A third type is a type that is not available at any time (not used at all or always unavailable), and the DU of IAB node #2 may not use these resources for data transmission/reception to/from the MT.

In the above types, the DU may also receive information about the above types, when DL time resources, UL time resources, flexible time resources, and reserved time resource are signaled by a higher-layer signal from the CU.

Referring to FIG. 5, the DU of the gNB 501 performs a normal gNB operation and performs scheduling to control the MT of IAB node #1 502 to transmit and receive data (521). The DU of IAB node #1 502 performs a normal gNB operation and performs scheduling to control the MT of IAB node #2 503 to transmit/receive data (522).

The DU may indicate radio resources to the MT of a lower IAB node to transmit/receive data to/from the MT of the IAB node based on radio resources allocated by the CU. A configuration for the radio resources may be transmitted to the MT by system information, a higher-layer signal, or a physical-layer signal. The radio resources may include DL time resources, UL time resources, flexible time resources, and reserved time resources. The DL time resources are resources in which the DU transmits a DL control/data signal to the MT of the lower IAB node. The UL time resources are resources in which the DU receives a UL control/data signal from the MT of the lower IAB node. The flexible time resources are resources available as DL time resources or UL time resources for the DU, and how the flexible time resources are used for the MT of the lower IAB node may be indicated by a DL control signal from the DU. Upon receipt of the DL control signal, the MT determines whether the flexible time resources are used as DL or UL time resources. When failing to receive the DL control signal, the MT does not perform a transmission/reception operation. That is, the MT does not monitor or decode a DL control channel in the resources or does not measure a signal in the resources.

The DL control signal may be signaled to the MT in the form of a combination of a higher-layer signal and a physical-layer signal, and the MT may receive the signaling to determine a slot format in a specific slot. The slot format may be configured to basically start with a DL symbol, include a flexible symbol in the middle, and end with a UL symbol (e.g., in a D-F-U structure). When only the above slot format is used, the DU of the IAB node may perform a DL transmission at the beginning of the slot. However, since the MT of the IAB node is configured with the same slot format (i.e., D-F-U structure) by the parent IAB node, the MT of the IAB node may not perform a UL transmission at the same time (corresponding to slot format indexes 0 to 55 in Table 2 below). The slot format configured to start with a UL symbol, include a flexible symbol in the middle, and end with a DL symbol may be illustrated in Table 2 below (corresponding to slot format indexes 56 to 96 in Table 2 below), by way of example. The slot format illustrated in Table 2 below may be transmitted to the MT by a DL control signal, and may be configured for the DU by the CU using F1AP.

TABLE 2

| Format | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | D | F | F | F |
| 6 | D | D | D | D | D | D | D | D | D | D | F | F | F | F |
| 7 | D | D | D | D | D | D | D | D | D | F | F | F | F | F |
| 8 | F | F | F | F | F | F | F | F | F | F | F | F | F | U |
| 9 | F | F | F | F | F | F | F | F | F | F | F | F | U | U |
| 10 | F | U | U | U | U | U | U | U | U | U | U | U | U | U |
| 11 | F | F | U | U | U | U | U | U | U | U | U | U | U | U |
| 12 | F | F | F | U | U | U | U | U | U | U | U | U | U | U |
| 13 | F | F | F | F | U | U | U | U | U | U | U | U | U | U |
| 14 | F | F | F | F | F | U | U | U | U | U | U | U | U | U |
| 15 | F | F | F | F | F | F | U | U | U | U | U | U | U | U |
| 16 | D | F | F | F | F | F | F | F | F | F | F | F | F | F |
| 17 | D | D | F | F | F | F | F | F | F | F | F | F | F | F |
| 18 | D | D | D | F | F | F | F | F | F | F | F | F | F | F |
| 19 | D | F | F | F | F | F | F | F | F | F | F | F | F | U |
| 20 | D | D | F | F | F | F | F | F | F | F | F | F | F | U |
| 21 | D | D | D | F | F | F | F | F | F | F | F | F | F | U |
| 22 | D | F | F | F | F | F | F | F | F | F | F | F | U | U |
| 23 | D | D | F | F | F | F | F | F | F | F | F | F | U | U |
| 24 | D | D | D | F | F | F | F | F | F | F | F | F | U | U |
| 25 | D | F | F | F | F | F | F | F | F | F | F | U | U | U |
| 26 | D | D | F | F | F | F | F | F | F | F | F | U | U | U |
| 27 | D | D | D | F | F | F | F | F | F | F | F | U | U | U |
| 28 | D | D | D | D | D | D | D | D | D | D | D | D | F | U |
| 29 | D | D | D | D | D | D | D | D | D | D | D | F | F | U |
| 30 | D | D | D | D | D | D | D | D | D | D | F | F | F | U |
| 31 | D | D | D | D | D | D | D | D | D | D | D | F | U | U |
| 32 | D | D | D | D | D | D | D | D | D | D | F | F | U | U |
| 33 | D | D | D | D | D | D | D | D | D | F | F | F | U | U |
| 34 | D | F | U | U | U | U | U | U | U | U | U | U | U | U |
| 35 | D | D | F | U | U | U | U | U | U | U | U | U | U | U |
| 36 | D | D | D | F | U | U | U | U | U | U | U | U | U | U |

TABLE 2-continued

| Format | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 37 | D | F | F | U | U | U | U | U | U | U | U | U | U | U |
| 38 | D | D | F | F | U | U | U | U | U | U | U | U | U | U |
| 39 | D | D | D | F | F | U | U | U | U | U | U | U | U | U |
| 40 | D | F | F | F | U | U | U | U | U | U | U | U | U | U |
| 41 | D | D | F | F | F | U | U | U | U | U | U | U | U | U |
| 42 | D | D | D | F | F | F | U | U | U | U | U | U | U | U |
| 43 | D | D | D | D | D | D | D | D | D | F | F | F | F | U |
| 44 | D | D | D | D | D | D | F | F | F | F | F | F | U | U |
| 45 | D | D | D | D | D | D | F | F | U | U | U | U | U | U |
| 46 | D | D | D | D | F | U | D | D | D | D | D | F | U | U |
| 47 | D | D | F | U | U | U | D | D | F | U | U | U | U | U |
| 48 | D | F | U | U | U | U | D | F | U | U | U | U | U | U |
| 49 | D | D | D | F | F | U | D | D | D | D | F | F | U | U |
| 50 | D | D | F | F | U | U | D | D | F | F | U | U | U | U |
| 51 | D | F | F | U | U | U | D | F | F | U | U | U | U | U |
| 52 | D | F | F | F | F | F | U | D | F | F | F | F | F | U |
| 53 | D | D | F | F | F | F | U | D | D | F | F | F | F | U |
| 54 | F | F | F | F | F | F | D | D | D | D | D | D | D | D |
| 55 | D | D | F | F | F | U | U | U | D | D | D | D | D | D |
| 56 | U | U | U | U | U | U | U | U | U | U | U | U | U | F |
| 57 | U | U | U | U | U | U | U | U | U | U | U | U | F | F |
| 58 | U | U | U | U | U | U | U | U | U | U | U | F | F | F |
| 59 | U | U | U | U | U | U | U | U | U | U | F | F | F | F |
| 60 | U | U | U | U | U | U | U | U | U | F | F | F | F | F |
| 61 | U | U | U | U | U | U | U | U | F | F | F | F | F | F |
| 62 | U | U | U | U | U | U | U | F | F | F | F | F | F | F |
| 63 | U | U | U | U | U | U | F | F | F | F | F | F | F | F |
| 64 | U | U | U | U | U | F | F | F | F | F | F | F | F | F |
| 65 | U | U | U | U | F | F | F | F | F | F | F | F | F | F |
| 66 | U | U | U | F | F | F | F | F | F | F | F | F | F | F |
| 67 | U | U | F | F | F | F | F | F | F | F | F | F | F | F |
| 68 | U | F | F | F | F | F | F | F | F | F | F | F | F | F |
| 69 | U | F | F | F | F | F | F | F | F | F | F | F | F | D |
| 70 | U | U | F | F | F | F | F | F | F | F | F | F | F | D |
| 71 | U | U | U | F | F | F | F | F | F | F | F | F | F | D |
| 72 | U | F | F | F | F | F | F | F | F | F | F | F | D | D |
| 73 | U | U | F | F | F | F | F | F | F | F | F | F | D | D |
| 74 | U | U | U | F | F | F | F | F | F | F | F | F | D | D |
| 75 | U | F | F | F | F | F | F | F | F | F | F | D | D | D |
| 76 | U | U | F | F | F | F | F | F | F | F | F | D | D | D |
| 77 | U | U | U | F | F | F | F | F | F | F | F | D | D | D |
| 78 | U | U | U | U | U | U | U | U | U | U | U | U | F | D |
| 79 | U | U | U | U | U | U | U | U | U | U | U | F | F | D |
| 80 | U | U | U | U | U | U | U | U | U | U | F | F | F | D |
| 81 | U | U | U | U | U | U | U | U | U | U | U | F | D | D |
| 82 | U | U | U | U | U | U | U | U | U | U | F | F | D | D |
| 83 | U | U | U | U | U | U | U | U | U | F | F | F | D | D |
| 84 | U | F | D | D | D | D | D | D | D | D | D | D | D | D |
| 85 | U | U | F | D | D | D | D | D | D | D | D | D | D | D |
| 86 | U | U | U | F | D | D | D | D | D | D | D | D | D | D |
| 87 | U | F | F | D | D | D | D | D | D | D | D | D | D | D |
| 88 | U | U | F | F | D | D | D | D | D | D | D | D | D | D |
| 89 | U | U | U | F | F | D | D | D | D | D | D | D | D | D |
| 90 | U | F | F | F | D | D | D | D | D | D | D | D | D | D |
| 91 | U | U | F | F | F | D | D | D | D | D | D | D | D | D |
| 92 | U | U | U | F | F | F | D | D | D | D | D | D | D | D |
| 93 | U | U | U | U | U | U | U | F | F | F | F | D | D | D |
| 94 | U | U | U | U | U | F | F | F | F | F | F | D | D | D |
| 95 | U | U | U | U | U | F | D | D | D | D | D | D | D | D |
| 96 | U | U | U | U | U | U | D | D | D | D | D | D | D | D |

The reserved time resources are resources in which data may not be transmitted/received to/from the lower MT of the DU, and the MT does not perform a transmission/reception operation in the resources. That is, the MT does not monitor or decode a DL control channel in the resources or does not measure a signal in the resources.

Accordingly, the MT of one IAB node receives scheduling and transmit/receive data under the control of the DU of a higher IAB node, and the DU of the IAB node is controlled by the CU of the gNB 501. As the MT and DU of one IAB are controlled by different entities, it is difficult to coordinate the MT and the DU in real time.

All possible simultaneous transmission and reception cases between the MT and the DU of an IAB node will be described below.

Figure 6:
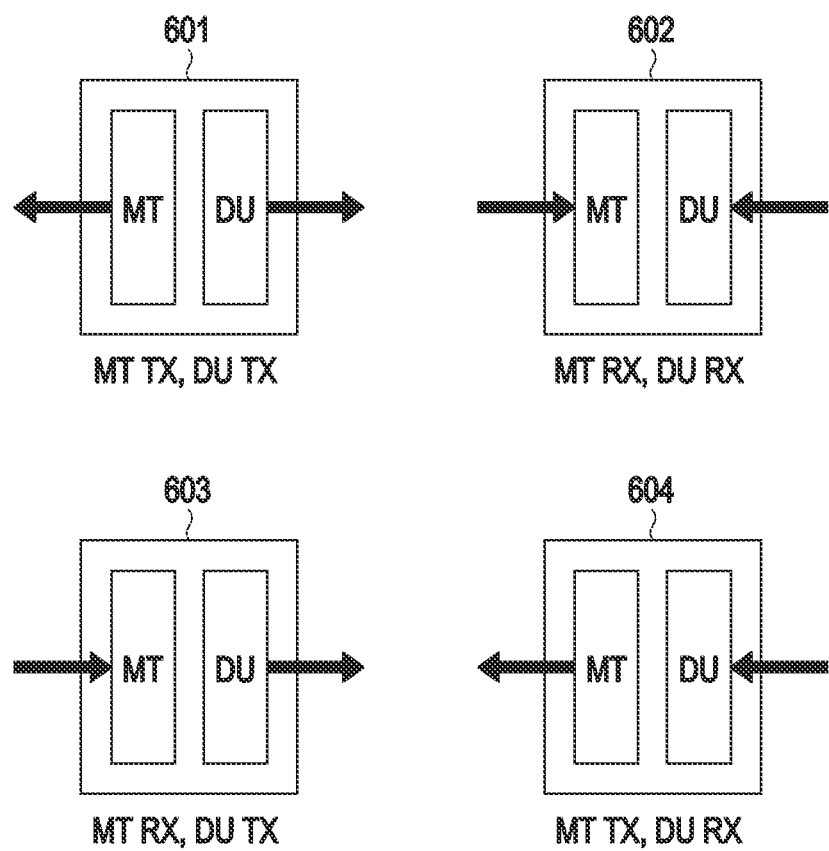
FIG. 6 is a diagram illustrating a communication method for simultaneous transmission and reception of a mobile termination (MT) and a distributed unit (DU) included in an IAB node in a wireless communication system according to an embodiment of the disclosure.

FIG. 6 is a diagram illustrating a communication method for simultaneous transmission and reception between the MT and the DU of an IAB node in a wireless communication system according to an embodiment of the disclosure.

Referring to FIG. 6, simultaneous transmission and reception between the MT and the DU of an IAB node means that the MT transmits or receives a signal and the DU transmits or receives a signal at the same time according to the multiplexing schemes described in FIGS. 2A and 2B.

Referring to FIG. 6, reference number 601 denotes that both of the MT and the DU of one IAB node transmit signals, respectively. In the case 601, the signal transmitted by the MT of the IAB node may be received by the DU of a parent IAB node or a gNB through a backhaul UL, as described with reference to FIGS. 3A, 3B, 4A, 4B, and 5. In the case 601, the signal transmitted by the DU of the IAB node may be received by the MT of a child IAB node through a backhaul DL or by an access UE through an access DL, as described with reference to FIGS. 3A, 3B, 4A, 4B, and 5.

Reference numeral 602 denotes that both of the MT and the DU of one IAB node receive signals, respectively. In the case 602, the signal received by the MT of the IAB node may be a signal transmitted from the DU of a parent IAB node or a gNB through a backhaul DL, as described with reference to FIGS. 3A, 3B, 4A, 4B, and 5. In the case 602, the signal received by the DU of the IAB node at the same time may be a signal transmitted by the MT of a child IAB node through a backhaul UL or by an access UE through an access UL, as described with reference to FIGS. 3A, 3B, 4A, 4B, and 5.

Reference number 603 denotes that the MT and the DU of the IAB node receive and transmit signals, respectively. That is, in the case 603, the MT of the IAB node may receive a signal, and the DU of the IAB node may transmit a signal at the same time. In the case 603, the signal received by the MT of the IAB node may be a signal transmitted from the DU of a parent IAB node or a gNB through a backhaul DL, as described with reference to FIGS. 3A, 3B, 4A, 4B, and 5. In addition, in the case 603, the signal transmitted by the DU of the IAB node at the same time may be a signal received by the MT of a child IAB node through a backhaul DL or by an access UE through an access DL, as described with reference to FIGS. 3A, 3B, 4A, 4B, and 5.

Reference number 604 denotes that the MT and the DU of the IAB node transmit and receive signals, respectively. That is, in the case 603, the MT of the IAB node may transmit a signal, and the DU of the IAB node may receive a signal at the same time. In the case 604, the signal transmitted by the MT of the IAB node may be received by the DU of a parent IAB node or a gNB through a backhaul UL, as described with reference to FIGS. 3A, 3B, 4A, 4B, and 5. In addition, in the case 604, the signal received by the DU of the IAB node at the same time may be a signal transmitted by the MT of a child IAB node through a backhaul UL or by an access UE through an access UL, as described with reference to FIGS. 3A, 3B, 4A, 4B, and 5.

In the disclosure, embodiments will be provided for a method of aligning slot timings in a situation in which both the MT and the DU of one IAB node transmit signals in the case 601 and related procedures of a parent IAB node and the IAB node. The following embodiments are also applicable to the cases 602, 603 and 604 as well as the case 601.

Figure 7:
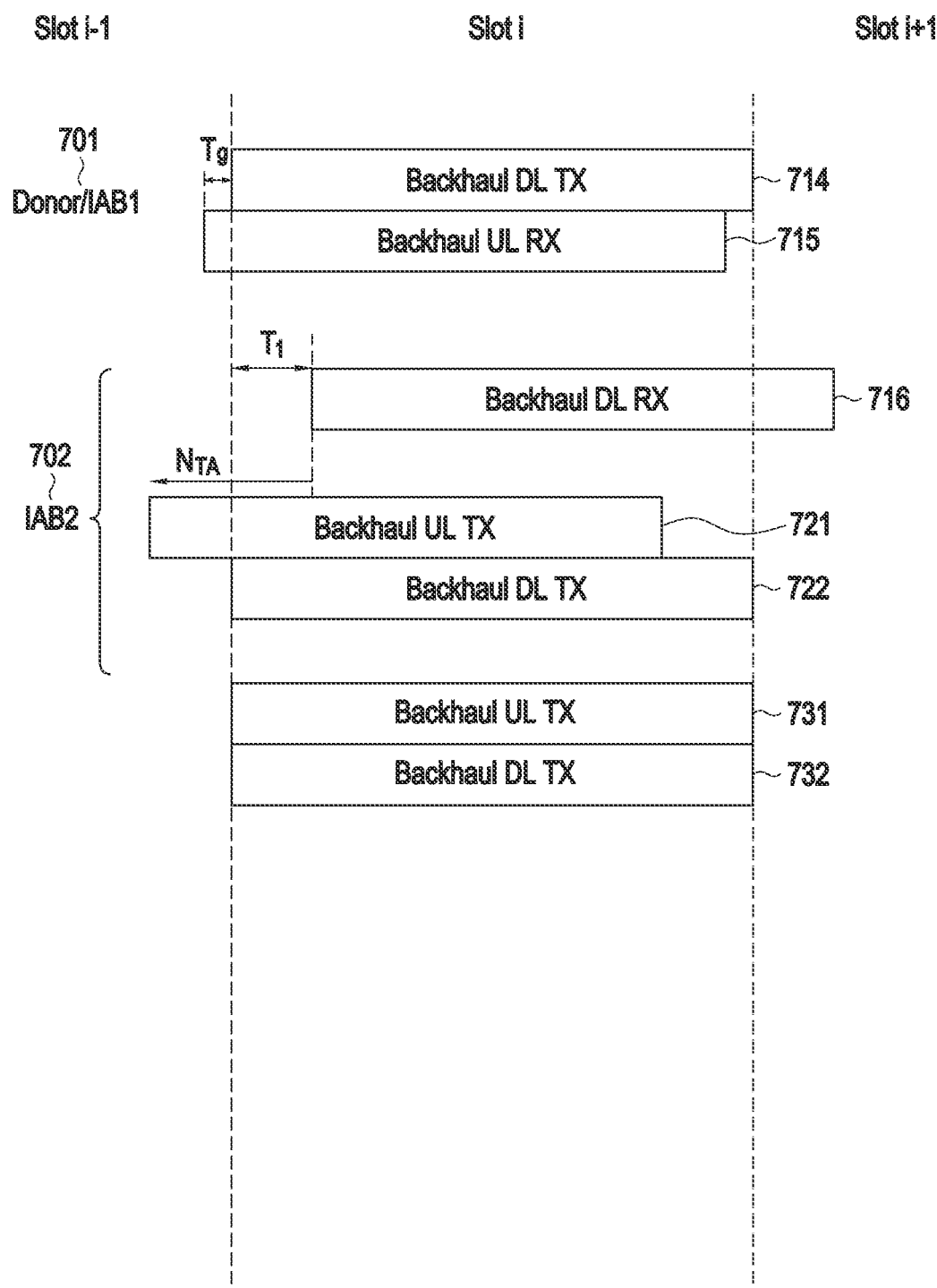
FIG. 7 is a diagram illustrating a communication method for aligning backhaul link transmission timings in an IAB node in a wireless communication system according to an embodiment of the disclosure.

FIG. 7 is a diagram illustrating an embodiment of aligning backhaul transmission timings in an IAB node in a wireless communication system according to an embodiment of the disclosure.

Referring to FIG. 7, a method of aligning DL transmission timings between the DUs of IAB nodes and a method of aligning the DL transmission timing of the DU of an IAB node with the UL transmission timing of the MT of the IAB node will be described. For convenience in the disclosure, aligning DL transmission timings between the DUs of IAB nodes in slot i is referred to as a Case #1 timing, and aligning the DL transmission timing of the DU of an IAB node with the UL transmission timing of the MT of the IAB node in slot i will be referred to as a Case #6 timing. In the disclosure, alignment of timings between A and B may refer to placing the time difference between the first symbols of A and B within a cyclic prefix (CP) duration value corresponding to a subcarrier spacing, when A and B have the same subcarrier spacing, and placing the time difference between the first symbols of A and B within a CP duration value corresponding to a larger subcarrier spacing, when A and B have different subcarrier spacings.

Referring to FIG. 7, $T_g$ denotes a switching time between a DU DL transmission 714 and a DU UL reception 715 in IAB1 701 being a gNB/parent IAB node. Alignment between the timing of a DL transmission 722 of IAB2 702 and the timing of a DU DL transmission 714 of the gNB/parent IAB node, IAB1 701, that is, the Case #1 timing will be described. The MT of IAB2 702 receives the DU DL transmission 714 from IAB1 701 after a propagation delay of $T_1$ (716). IAB2 702 may assume that the timing difference between the DU DL transmission 714 and the DL reception 716 by the MT of IAB2 702 is, for example, $(N_{TA}/2+N_{delta}+T_{delta} \cdot G_{step}) \cdot T_c$ to estimate the propagation delay time of $T_1$. $N_{TA}$ is a UL timing advance (TA) provided by IAB1 701. $T_{delta}$ is provided by IAB1 701. IAB2 702 may receive $N_{TA}$ and $T_{delta}$ in a MAC signal from IAB1 701. $N_{delta}$ and $G_{step}$ are constants for frequency range 1 (FR1) and frequency range 2 (FR2), defined in the 5H system. For example, for FR1, $N_{delta}=-70528$ and $G_{step}=64$, and for FR2, $N_{delta}=-17644$ and $G_{step}=32$.

The Case #1 timing of IAB2 702 may be applied by applying the above timing difference based on the DL reception 716 by the MT of IAB2 702. For the timing of the UL transmission 721 of IAB2 702, IAB2 702 starts the UL transmission 721 at a time earlier by the UL TA $N_{TA}$ from the DL reception 716 by the MT of IAB2 702. That is, the timing of the UL transmission 721 applied in the Case #1 timing is adjusted in the same manner as a UL transmission timing adjustment procedure applied by a UE.

The Case #6 timing scheme for aligning the timing of a UL transmission 731 of the MT of IAB2 702 with the timing of a DL transmission 732 of the DU of IAB2 702 will be described. In the disclosure, three methods are proposed.

First Method

In the first method, the timing of the UL transmission 731 of the MT is aligned, referring to (based on) the timing of the DL transmission 732 of the DU of IAB2 702. When IAB1 701 instructs IAB2 702 to apply the Case #6 timing, IAB2 702 may align the timing of the UL transmission 731 of the MT of IAB2 702 with the timing of the DL transmissions 722 and 732 of the DU of IAB2 702, determined by applying the Case #1 timing. However, the timing of the DL transmission 732 of the DU to be referred to may be less accurate over time. In the first method, four schemes are proposed to maintain the accuracy.

In a first scheme, IAB2 702 may receive a timer value set by a higher-layer signal. When IAB2 702 is instructed to apply the Case #6 timing, IAB2 702 may count a timer. Only when the timer value is not exceeded, IAB2 702 may apply the Case #6 timing (that is, align the timing of the MT UL transmission 731 with the timing of the DU DL transmission 732). When the timer value is exceeded and thus the timer expires, IAB2 702 may apply the Case #1 timing, discontinuing the application of the Case #6 timing (that is, determine the timing of the MT UL transmission 721 based on the UL TA $N_{TA}$).

In a second scheme, IAB1 701 may indicate/provide information including a value required to adjust the DU DL transmission timing of IAB2 702 to maintain the accuracy of the DL transmission timing of the DU to be referred to. IAB2 702 may receive the indicated/provided information to adjust the timing of the DU DL transmissions 722 and 732. For example, the indicated/provided information (value) may be the difference (e.g., $T_1$ in FIG. 7) between the timing of the DU DL transmission 714 of IAB1 701 and the timing of the MT DL reception 716 of IAB2 702.

In a third scheme, when IAB2 702 receives the indicated/provided information (value) for adjusting the timing of the DU DL transmissions 722 and 732 within the set timer, IAB2 702 applies the above second scheme, resets the timer count to 0, and counts the timer again. When failing to receive the indicated/provided information (value) for adjusting the DU DL transmission timing within the set timer, IAB2 702 applies the first scheme.

In a fourth scheme, even while IAB2 702 is applying the Case #6 timing in the first method, IAB2 702 may receive the UL TA $N_{TA}$ and $T_{delta}$ by a MAC signal from IAB1 701. Instead of applying $N_{TA}$ for the timing of the MT UL transmission 721, IAB2 702 may use $N_{TA}$ to align the timing of the DU DL transmission 722 of IAB2 702 described in relation to the Case #1 timing with the timing of the DU DL transmission 714 of IAB1 701. As described, $N_{TA}$ may not be applied for the timing of the MT UL transmission 721, and the timing of the MT UL transmission 731 may be aligned with the timing of the DU DL transmission 732 according to the Case #6 timing.

IAB2 702 may not apply a UL TA $N_{TA}$ previously received from IAB1 701 or received from IAB1 701 while applying the first scheme, for the MT UL transmission timing, or may not expect to receive the UL TA $N_{TA}$.

An embodiment of signaling IAB2 702 to apply the Case #1 or Case #6 timing by IAB1 701 will be described. Before that, the traffic condition of IAB2 702 in which simultaneous transmissions of the DU and the MT are required may be reported to IAB1 701. For example, the traffic condition may be information about the buffer status of UL/DL traffic or information about the buffer status of UL/DL traffic during a specific time period (or specific slots).

Signaling 1: Bitmap information indicating whether the Case #6 timing or the Case #1 timing is applied to each slot, periodicity information, time duration information, information about slots in which the Case #6 timing may not be applied, and so on by a higher-layer signal.

Signaling 2: A higher-layer signal including signaling 1 and a DL control signal indicating whether the higher-layer signal is activated.

Signaling 3: A higher layer signal including a signaling 1 set and a DL control signal indicating one signaling 1 in the set.

Signaling 4: It is indicated whether the Case #6 timing is applied by a bit field of a DL control signal that schedules a UL data channel of the MT of IAB2 702.

IAB2 702 may receive signaling by the signaling schemes alone or in combination and determine whether to apply the Case #1 timing or the Case #6 timing.

Second Method

In the second method, the DL transmission timing of the DU is aligned, referring to (or based on) the UL transmission timing of the MT of IAB2 702.

When IAB1 701 instructs IAB2 702 to apply the Case #6 timing through the signaling schemes described in the first method, IAB1 701 may additionally indicate a UL TA $N_{TA}$ for the Case #6 timing, and IAB2 702 may determine the UL transmission timing of the MT by applying the additional UL TA $N_{TA}$ and align the DL transmission timing of the DU based on the determined UL transmission timing of the MT. For the DL transmission timing of the DU, IAB1 701 may transmit an additional $T_{delta}$ separately from $T_{delta}$ indicated for the Case #1 timing. IAB2 702 may receive the UL TA and the additional $T_{delta}$ for the Case #6 timing in a MAC signal from IAB1 701.

Third Method

In the third method, IAB1 701 configures whether IAB2 702 is to apply the first method or the second method by a higher-layer signal. IAB2 702 may receive the higher-layer signal and apply the Case #6 timing by applying the first method or the second method as configured by the higher-layer signal.

In the case where IAB2 702 alternately switches between the Case #1 timing and the Case #6 timing according to the instruction of IAB1 701, when the UL transmission timing of the MT of IAB2 702 advances by the Case #1 timing or recedes by the Case #6 timing, a UL transmission period based on the Case #1 timing may overlap with a UL transmission period based on the Case #6 timing. To solve the overlap problem, IAB1 701 may indicate a guard period between the UL transmission period based on the Case #1 timing and the UL transmission period based on the Case #6 timing to IAB2 702, and IAB2 702 may receive the indication. Alternatively, IAB2 702 may report a guard period required between the UL transmission period based on the Case #1 timing and the UL transmission period based on the Case #6 timing to IAB1 701, and IAB1 701 may receive the report.

Figure 8:
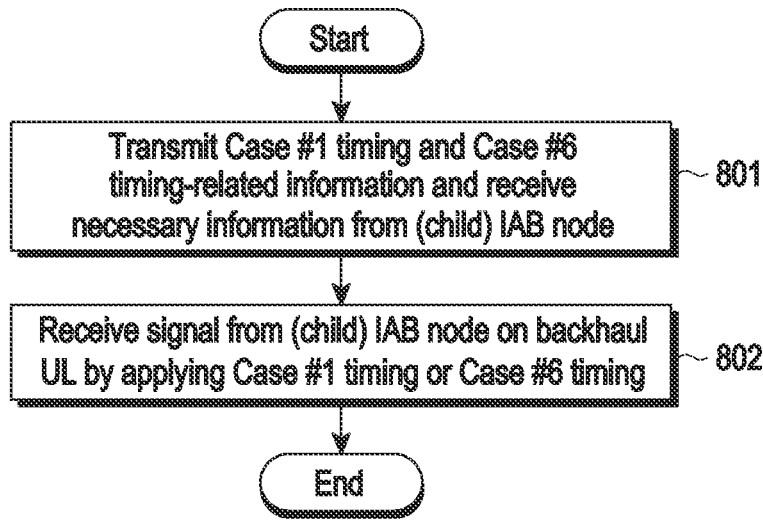
FIG. 8 is a flowchart illustrating an operation of a next generation Node B (gNB)/parent IAB node in a wireless communication system according to an embodiment of the disclosure.

FIG. 8 is a flowchart illustrating an operation of a gNB/parent IAB node in a wireless communication system according to an embodiment of the disclosure.

Referring to FIG. 8, in operation 801, IAB1 701 transmits Case #1 timing and Case #6 timing-related information according to the embodiment of the disclosure described in FIG. 7 to IAB2 702 of FIG. 7, and receives necessary information from IAB2 702. The Case #1 timing and Case #6 timing-related information may be a higher-layer signal, signaling information, a MAC signal, or the like that IAB1 701 provides to IAB2 702 in the first to third methods. The necessary information may be various types of information such as information about a traffic condition and information about a guard period that IAB2 702 reports to IAB1 701 in the first to third methods. In operation 802, IAB1 701 receives a signal from IAB2 702 on a backhaul UL by applying the Case #1 timing or the Case #6 timing according to the embodiment of the disclosure described with reference to FIG. 7.

Figure 9:
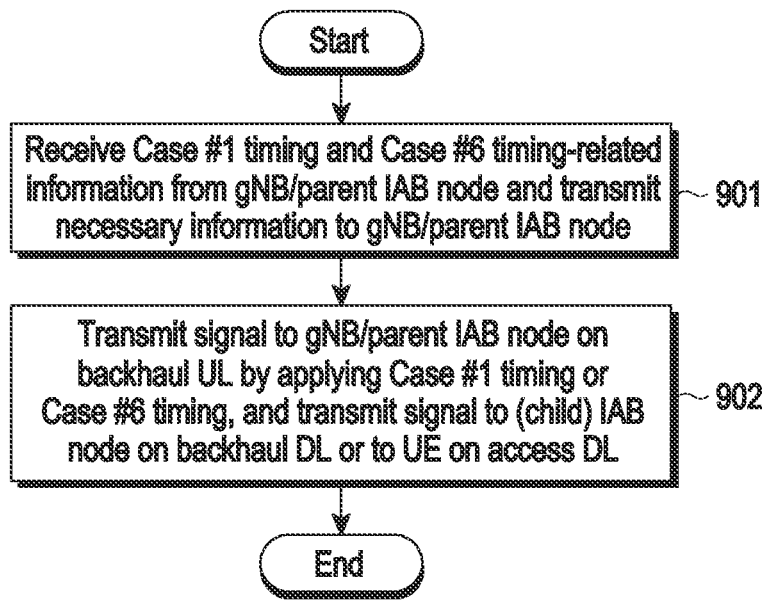
FIG. 9 is a flowchart illustrating an operation of an IAB node in a wireless communication system according to an embodiment of the disclosure.

FIG. 9 is a flowchart illustrating an operation of an IAB node in a wireless communication system according to an embodiment of the disclosure.

Referring to FIG. 9, in operation 901, IAB2 702 of FIG. 7 receives Case #1 timing and Case #6 timing-related information to IAB1 701 of FIG. 7 and transmits necessary information to IAB1 701, according to the embodiment of the disclosure described in FIG. 7. In operation 902, IAB2 702 transmits a signal on the backhaul UL to IAB1 701 by applying the Case #1 timing or the Case #6 timing and transmits a signal to the lower (child) IAB node on a backhaul DL or to an access UE on an access DL, according to the embodiment of the disclosure described with reference to FIG. 7.

Figure 10:
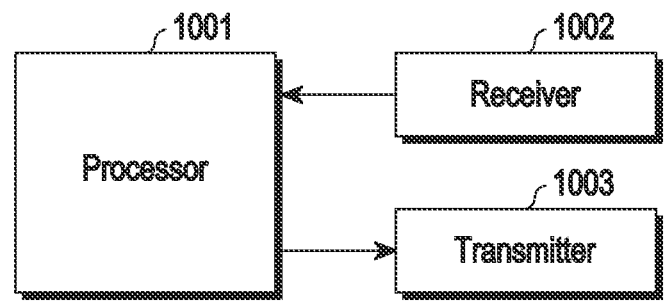
FIG. 10 is a block diagram illustrating the configuration of a user equipment (UE) according to an embodiment of the disclosure.
Figure 11:
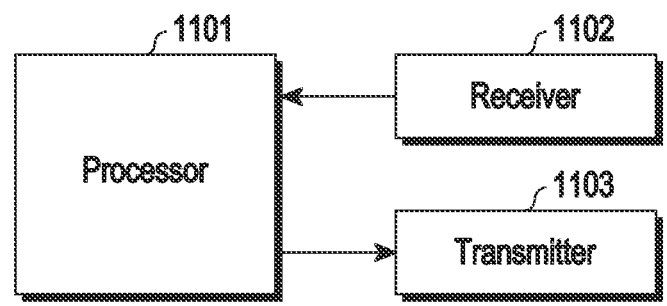
FIG. 11 is a block diagram illustrating the configuration of a gNB according to an embodiment of the disclosure.
Figure 12:
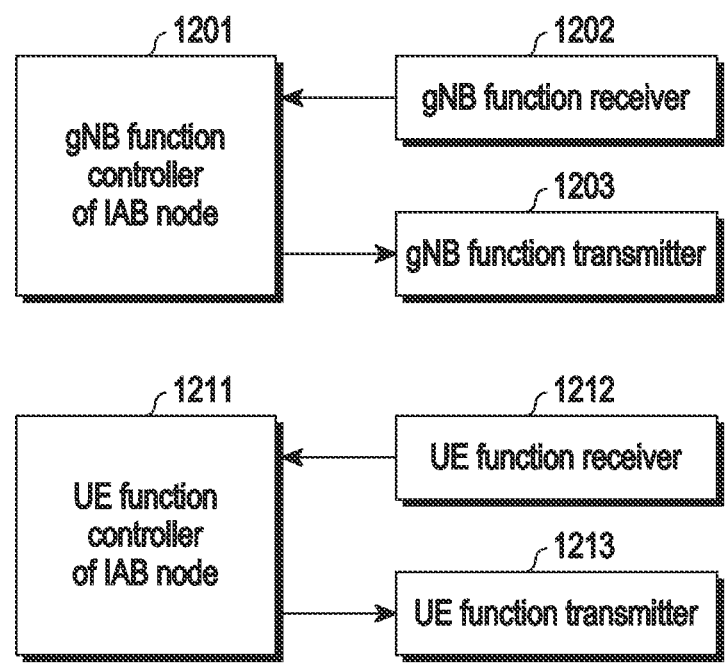
FIG. 12 is a block diagram illustrating the configuration of an IAB node according to an embodiment of the disclosure.

To perform the above embodiments of the disclosure, FIGS. 10 and 11 illustrate transmitters, receivers, and processors of a UE and a gNB, respectively. A transmitter and a receiver may be referred to as a transceiver. FIG. 12 also illustrates an apparatus of an IAB node. In the 5G communication system described in the above embodiments, when a signal is transmitted and received on a backhaul link or an access link through an IAB node, a method of transmitting and receiving signals by a gNB (donor gNB) that transmits and receives signals to and from an IAB node and by a UE that transmits and receives signals to and from an IAB node, have been described. To perform the methods, a transmitter, a receiver, and a processor of each of a gNB, a UE, and an IAB node may operate according to an embodiment.

FIG. 10 is a diagram illustrating the configuration of a UE according to an embodiment of the disclosure.

Referring to FIG. 10, the UE of the disclosure may include a processor 1001, a receiver 1002, and a transmitter 1003.

The processor 1001 may control a series of processes in which the UE may operate according to the afore-described embodiments of the disclosure illustrated in FIGS. 1, 2A, 2B, 3A, 3B, 4A, 4B, 5, 6, 7, and 8, alone or in combination. For example, the processor 1001 may differently control access link transmission and reception to and from an IAB node according to embodiments of the disclosure. The receiver 1002 and the transmitter 1003 may be collectively referred to as a transceiver in an embodiment of the disclosure. The transceiver may transmit and receive a signal to and from a gNB. The signal may include at least one of control information or data. To this end, the transceiver may include an RF transmitter for up-converting and amplifying the frequency of a transmission signal, and an RF receiver for low-noise-amplifying and down-converting a received signal. Further, the transceiver may receive a signal on a radio channel and output the received signal to the processor 1001, and transmit a signal received from the processor 1001 on a radio channel.

FIG. 11 is a diagram illustrating the configuration of a gNB (donor gNB) according to an embodiment of the disclosure.

Referring to FIG. 11, the gNB of the disclosure may include a processor 1101, a receiver 1102, and a transmitter 1103.

The processor 1101 may control a series of processes in which the gNB operates according to the embodiments of the disclosure of FIGS. 1, 2A, 2B, 3A, 3B, 4A, 4B, 5, 6, 7, and 8 described above, alone or in combination. For example, the processor 1101 may differently control backhaul link transmission and reception and access link transmission reception to and from an IAB node according to embodiments of the disclosure. The receiver 1102 and the transmitter 1103 may be collectively referred to as a transceiver in the embodiment of the disclosure. The transceiver may transmit/receive a signal to/from a UE or a (child) IAB node. The signal may include at least one of control information or data. To this end, the transceiver may include an RF transmitter for up-converting and amplifying the frequency of a transmission signal, and an RF receiver for low-noise-amplifying and down-converting a received signal. In addition, the transceiver may receive a signal on a radio channel and output the received signal to the processor 1101, and transmit a signal received from the processor 1101 on a radio channel.

FIG. 12 is a diagram illustrating the configuration of an IAB node according to an embodiment of the disclosure.

Referring to FIG. 12, the IAB node of the disclosure may include a gNB function controller 1201, a gNB function receiver 1202, and a gNB function transmitter 1203, for transmission and reception to and from a lower (child) IAB node on a backhaul link. Further, the IAB node may include a UE function controller 1211, a UE function receiver 1212, and a UE function transmitter 1213, for initial access to a higher (parent) IAB node and/or a donor gNB, transmission and reception of a higher-layer signal before transmission and reception on a backhaul link, and transmission and reception to and from the higher (parent) IAB node and the donor gNB on a (radio) backhaul link.

The gNB function controller 1201 of the IAB node may control a series of processes in which the IAB node operates like a gNB according to the embodiment of the disclosure. For example, the gNB function controller 1201 may perform the function of the DU of an IAB node as described before. For example, the gNB function controller 1201 may differently control transmission and reception to and from a lower IAB node on a backhaul link and transmission and reception to and from a UE on an access link. The gNB function receiver 1202 and the gNB function transmitter 1203 may be collectively referred to as a first transceiver in the embodiment of the disclosure. The first transceiver may transmit/receive a signal to/from a UE or a lower (child) IAB node. The signal may include at least one of control information or data. To this end, the first transceiver may include an RF transmitter for up-converting and amplifying the frequency of a transmission signal, and an RF receiver for low-noise-amplifying and down-converting a received signal. In addition, the first transceiver may receive a signal on a radio channel and output the received signal to the gNB function controller 1201, and transmit a signal received from the gNB function controller 1201 on a radio channel.

The UE function controller 1211 of the IAB node may control a series of processes in which a lower (child) IAB node may operate like a UE, for data transmission and reception to and from a donor gNB or a higher (parent) IAB node according to the embodiment of the disclosure. For example, the UE function controller 1211 may perform the function of the MT of an IAB node as described before. For example, the UE function controller 1211 may differently control transmission and reception to and from the donor gNB and/or the higher (parent) IAB node on a (radio) backhaul link. The UE function receiver 1212 and the UE function transmitter 1213 may be collectively referred to as a second transceiver in the embodiment of the disclosure. The second transceiver may transmit and receive a signal to and from the donor gNB and the higher IAB node. The signal may include at least one of control information or data. To this end, the second transceiver may include an RF transmitter for up-converting and amplifying the frequency of a transmission signal, and an RF receiver for low-noise-amplifying and down-converting a received signal. In addition, the second transceiver may receive a signal on a radio channel and output the received signal to the UE function controller 1211, and transmit a signal received from the UE function controller 1211 on a radio channel.

The gNB function controller 1201 of the IAB node and the UE function controller 1211 of the IAB node, included in the IAB node in FIG. 12, may be integrated as an IAB node controller. In this case, the IAB node controller 1200 may control the functionalities of the DU and the MT together in the IAB node. The gNB function controller 1201, the UE function controller 1211, and the IAB node controller may be implemented as at least one processor. The first transceiver and the second transceiver may be provided separately or as one integrated transceiver.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a child integrated access and backhaul (IAB) node including an IAB-mobile termination (MT) and an IAB-distributed unit (DU) in a wireless communication system including a parent IAB node and the child IAB node, the method comprising:
receiving, from the parent IAB node, information indicating a timing case to be applied for the child IAB node;
transmitting, to the parent IAB node, guard information associated with switching between timing cases including the indicated timing case;
setting an uplink transmission time of the IAB-MT to a transmission time of the IAB-DU in case that the indicated timing case is a first timing case; and
setting an uplink transmission time of the IAB-MT based on a timing advance (TA) applied for a user equipment (UE) in case that the indicated timing case is a second timing case.

2. The method of claim 1, wherein the uplink transmission timing of the IAB-MT is identically set based on the transmission timing of the IAB-DU.

3. The method of claim 1, wherein the information indicating the timing case is received using a medium access control (MAC) signal.

4. The method of claim 1, wherein the indicated timing case is set in a unit of a slot.

5. A child integrated access and backhaul (IAB) node including an IAB-mobile termination (MT) and an IAB-distributed unit (DU) in a wireless communication system including a parent IAB node and the child IAB node, the child IAB node comprising:
a transceiver; and
a processor configured to:
receive, via the transceiver from the parent IAB node, information indicating a timing case to be applied for the child IAB node,
transmit, to the parent IAB node, guard information associated with switching between timing cases including the indicated timing case,
set an uplink transmission time of the IAB-MT to a transmission time of the IAB-DU in case that the indicated timing case is a first timing case, and
set an uplink transmission time of the IAB-MT based on a timing advance (TA) applied for a user equipment (UE) in case that the indicated timing case is a second timing case.

6. The child IAB node of claim 5, wherein the uplink transmission timing of the IAB-MT is identically set based on the transmission timing of the IAB-DU.

7. The child IAB node of claim 5, wherein the processor is further configured to receive the information indicating the timing case is received using a medium access control (MAC) signal.

8. The child IAB node of claim 5, wherein the indicated timing case is set in a unit of a slot.

* * * * *